(12) United States Patent
Shike

(10) Patent No.: US 10,822,773 B2
(45) Date of Patent: Nov. 3, 2020

(54) CONSTRUCTION MACHINE AND CONSTRUCTION MANAGEMENT SYSTEM

(71) Applicant: Komatsu Ltd., Tokyo (JP)

(72) Inventor: Chikashi Shike, Tokyo (JP)

(73) Assignee: KOMATSU LTD., Tokyo (JP)

(*) Notice: Subject to any disclaimer, the term of this patent is extended or adjusted under 35 U.S.C. 154(b) by 61 days.

(21) Appl. No.: 15/747,787

(22) PCT Filed: Oct. 5, 2016

(86) PCT No.: PCT/JP2016/079705
§ 371 (c)(1),
(2) Date: Jan. 26, 2018

(87) PCT Pub. No.: WO2017/061515
PCT Pub. Date: Apr. 13, 2017

(65) Prior Publication Data
US 2018/0216318 A1    Aug. 2, 2018

(30) Foreign Application Priority Data

Oct. 5, 2015 (JP) .................. 2015-198085

(51) Int. Cl.
*H04N 7/18* (2006.01)
*H04N 13/239* (2018.01)
(Continued)

(52) U.S. Cl.
CPC ............ *E02F 9/26* (2013.01); *B60R 1/00* (2013.01); *E02F 9/2054* (2013.01); *E02F 9/264* (2013.01); *G07C 5/008* (2013.01);
*H04N 7/181* (2013.01); *H04N 13/239* (2018.05); *B60R 2300/105* (2013.01); *B60R 2300/107* (2013.01)

(58) Field of Classification Search
None
See application file for complete search history.

(56) References Cited

U.S. PATENT DOCUMENTS 9,300,954 B2   3/2016   Tanizumi et al.
2003/0074134 A1*  4/2003  Shike ............... G08G 1/20
                                         701/34.4
(Continued)

FOREIGN PATENT DOCUMENTS

CN    104662389 A    5/2015
JP    2002-328022 A  11/2002
(Continued)

OTHER PUBLICATIONS

Office Action dated Mar. 9, 2018, issued for the Australian patent application No. 2016336318.
(Continued)

*Primary Examiner* — Kate H Luo
(74) *Attorney, Agent, or Firm* — Locke Lord LLP

(57) ABSTRACT

A construction machine includes: a vehicle body; a plurality of imaging devices provided to the vehicle body; a data processing unit configured to perform image processing on each piece of two-dimensional image data acquired by the plurality of imaging devices to generate three-dimensional image data; and a data output unit configured to output the two-dimensional image data to a display device associated with the vehicle body.

15 Claims, 15 Drawing Sheets

(51) Int. Cl.
*G07C 5/00* (2006.01)
*E02F 9/26* (2006.01)
*B60R 1/00* (2006.01)
*E02F 9/20* (2006.01)

(56) References Cited

U.S. PATENT DOCUMENTS

| | | | |
|---|---|---|---|
| 2010/0245573 A1* | 9/2010 | Gomi | B60R 1/00 |
| | | | 348/148 |
| 2013/0057713 A1* | 3/2013 | Khawand | H04N 5/232 |
| | | | 348/208.1 |
| 2015/0207993 A1* | 7/2015 | Kato | H04N 5/23245 |
| | | | 348/221.1 |
| 2015/0249821 A1 | 9/2015 | Tanizumi et al. | |
| 2017/0136962 A1* | 5/2017 | Morita | H04N 13/239 |

FOREIGN PATENT DOCUMENTS

| | | |
|---|---|---|
| JP | 2010-248777 A | 11/2010 |
| JP | 2013-036243 A | 2/2013 |
| WO | 2013/170348 A1 | 11/2013 |

OTHER PUBLICATIONS

International Search Report dated Jan. 10, 2017, issued for PCT/JP2016/079705.

* cited by examiner

CONSTRUCTION MACHINE AND CONSTRUCTION MANAGEMENT SYSTEM

FIELD

The present invention relates to a construction machine and a construction management system.

BACKGROUND

As disclosed in Patent Literature 1, a technique of acquiring image data of a construction site by using a stereo camera included in a construction machine is known.

CITATION LIST

Patent Literature

Patent Literature 1: Japanese Patent Application Laid-open No. 2013-036243 A

SUMMARY

Technical Problem

Many personnel are involved in construction at a construction site such as a driver of a construction machine, workers working at the construction site, and a manager working outside the construction site. If a technology that allow these personnel to smoothly confirm image data of the construction site is established, construction management can be smoothly performed, thereby contributing to improvement of productivity at the construction site.

An object of an aspect of the present invention is to provide a construction machine and a construction management system capable of smoothly confirming image data of a construction site.

Solution to Problem

According to a first aspect of the present invention, a construction machine, comprises: a vehicle body; a plurality of imaging devices provided to the vehicle body; a data processing unit configured to perform image processing on each piece of two-dimensional image data acquired by the plurality of imaging devices to generate three-dimensional image data; and a data output unit configured to output the two-dimensional image data to a display device associated with the vehicle body.

According to a second aspect of the present invention, a construction management system, comprises: a data processing unit configured to perform image processing on each piece of two-dimensional image data of a construction machine acquired by a plurality of imaging devices comprised in the construction machine to generate three-dimensional image data; and a data output unit configured to output display data to a display device, the display data including the two-dimensional image data and being associated with the construction machine.

Advantageous Effects of Invention

According to an aspect of the present invention, a construction machine and a construction management system capable of smoothly confirming image data of a construction site are provided.

DESCRIPTION OF EMBODIMENTS

Hereinafter, embodiments of the present invention will be described with reference to the drawings; however, the present invention is not limited thereto. Components of the respective embodiments described below can be combined as appropriate. Moreover, a part of the components may not be used.

First Embodiment

<Construction Machine>

Figure 1:
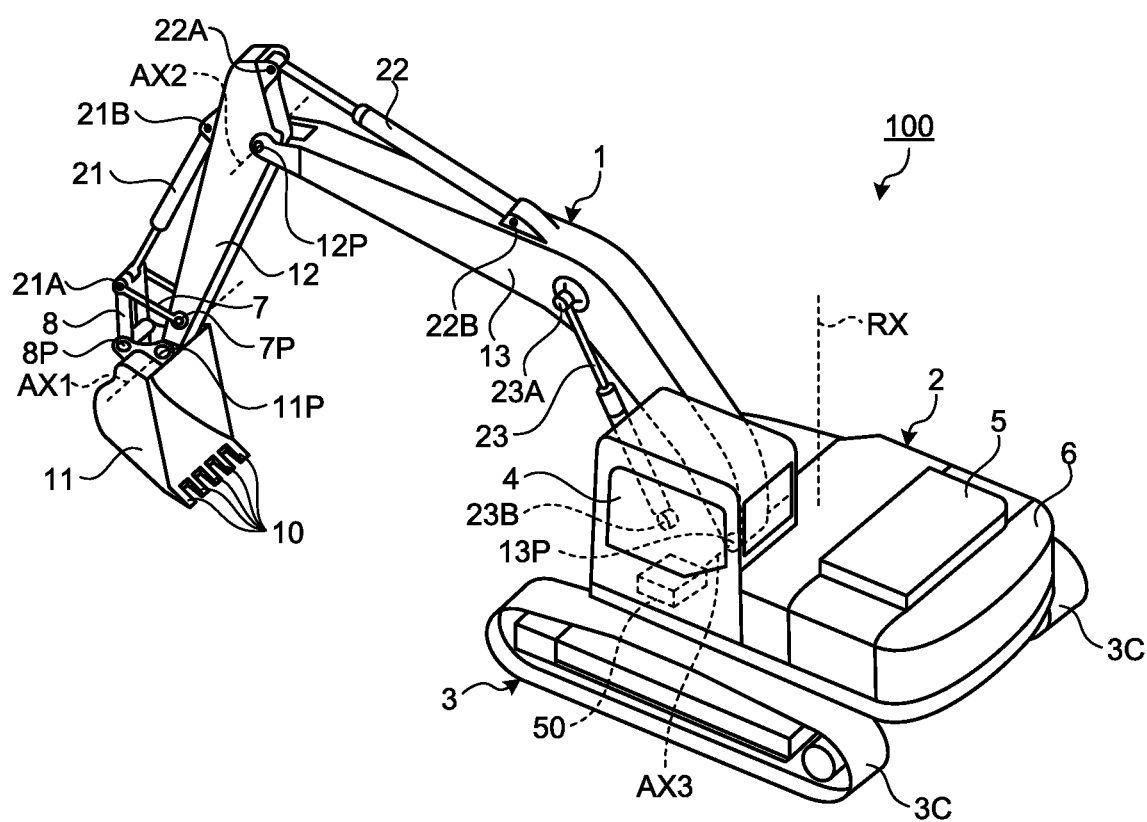
FIG. 1 is a perspective view schematically illustrating an example of a construction machine according to the present embodiment.

FIG. 1 is a perspective view illustrating an example of a construction machine 100 according to the present embodiment. In the present embodiment, an example in which the construction machine 100 is an excavator will be described. In the following description, the construction machine 100 is referred to as an excavator 100 as appropriate.

As illustrated in FIG. 1, the excavator 100 includes a work machine 1 that is hydraulically operated, a vehicle body 2 that supports the work machine 1, a traveling device 3 that supports the vehicle body 2, and a control device 50 that controls the excavator 1. The vehicle body 2 can swing about the swinging axis RX while being supported by the traveling device 3. The vehicle body 2 is arranged on the traveling device 3. In the following description, the vehicle body 2 is referred to as an upper swinging body 2 as appropriate, and the traveling device 3 is referred to as a lower traveling body 3 as appropriate.

Figure 2:
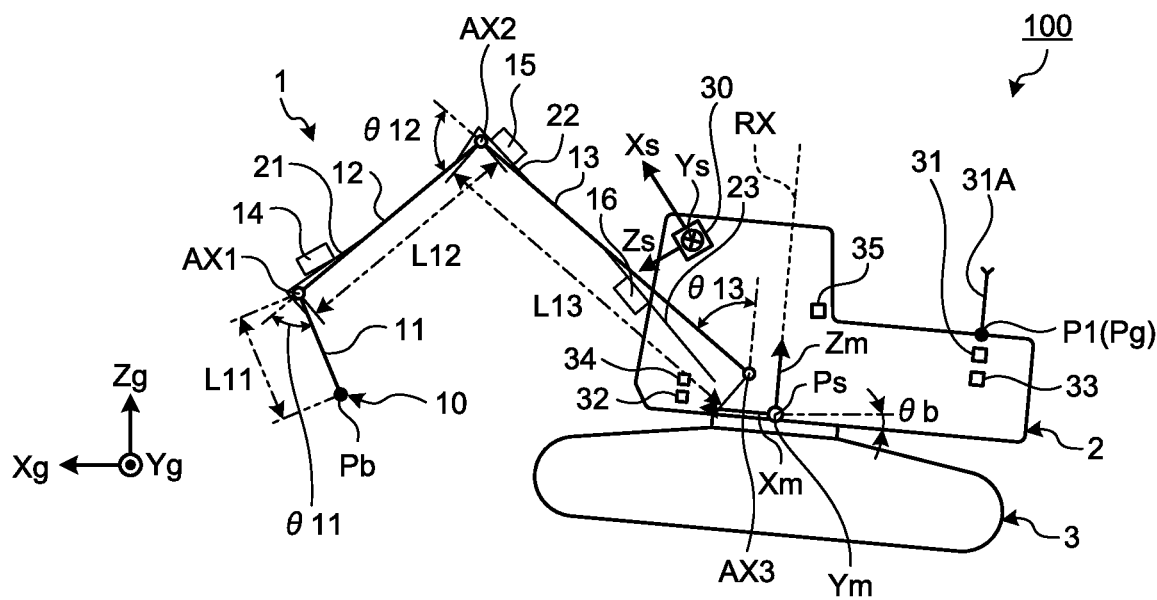
FIG. 2 is a side view schematically illustrating an example of the construction machine according to the present embodiment.

The upper swinging body 2 has a cab 4 on which an operator is to board, a machine room 5 in which an engine, a hydraulic pump and the like are accommodated, and a counterweight 6. Note that, in FIG. 1, illustration of a GPS antenna 31A illustrated in FIG. 2 is omitted.

The lower traveling body 3 has a pair of crawlers 3C. Rotation of the crawlers 3C causes the excavator 100 to travel. Note that the lower traveling body 3 may be wheels (tires).

The work machine 1 is supported by the upper swinging body 2. The work machine 1 has a bucket 11 having teeth 10, an arm 12 coupled to the bucket 11, and a boom 13 coupled to the arm 12. The teeth 10 of the bucket 11 may be tip portions of a convex blades provided to the bucket 11. The teeth 10 of the bucket 11 may be tip portions of straight blades provided to the bucket 11.

The bucket 11 and the arm 12 are coupled via a bucket pin 11P. The bucket 11 is supported by the arm 12 so as to be rotatable about a rotation axis AX1. The arm 12 and the boom 13 are coupled via an arm pin 12P. The arm 12 is supported by the boom 13 so as to be rotatable about a rotation axis AX2. The boom 13 and the upper swinging body 2 are coupled via a boom pin 13P. The boom 13 is supported by the upper swinging body 2 so as to be rotatable about a rotation axis AX3.

The rotation axis AX1, the rotation axis AX2, and the rotation axis AX3 are parallel to each other. The rotation axes AX1, AX2, and AX3 and an axis parallel to a swinging axis RX are orthogonal to each other. In the following description, the axial directions of the rotation axes AX1, AX2, and AX3 are referred to as a vehicle width direction of the upper swinging body 2 as appropriate, and a direction orthogonal to both the rotation axes AX1, AX2, and AX3 and the swinging axis RX are referred to as a front-rear direction of the upper swinging body 2 as an anteroposterior direction appropriate.

The cab 4 is included in a front part of the upper swinging body 2. The counterweight 6 is included in a rear part of the upper swinging body 2. The machine room 5 is arranged behind the cab 4. The work machine 1 is coupled to the front part of the upper swinging body 2.

The excavator 100 has a bucket cylinder 21 for driving the bucket 11, an arm cylinder 22 for driving the arm 12, and a boom cylinder 23 for driving the boom 13. The bucket cylinder 21, the arm cylinder 22, and the boom cylinder 23 are hydraulic cylinders driven by hydraulic fluid.

A distal end portion of the bucket cylinder 21 is coupled to one end portion of a link member 7 and one end portion of a link member 8 via a top pin 21A. The other end portion of the link member 7 is coupled to a distal end portion of the arm 12 via a link pin 7P. The other end portion of the link member 8 is coupled to the bucket 11 via a link pin 8P. A proximal end portion of the bucket cylinder 21 is coupled to the arm 12 via a foot pin 21B.

A distal end portion of the arm cylinder 22 is coupled to the arm 12 via a top pin 22A. A proximal end portion of the arm cylinder 22 is coupled to the boom 13 via a foot pin 22B.

A distal end portion of the boom cylinder 23 is coupled to the boom 13 via a top pin 23A. A proximal end portion of the boom cylinder 23 is coupled to the upper swinging body 2 via a foot pin 23B.

Note that the bucket 11 may be a tilt bucket. A tilt bucket is a bucket that can be tilted in the vehicle width direction by operation of a bucket tilt cylinder. With the bucket 11 tilted in the vehicle width direction, the excavator 100 can freely shape or level a slope or a flat ground.

The control device 50 includes a computer system. The control device 50 includes an arithmetic device including a processor such as a central processing unit (CPU), a storage device including a memory and a storage such as a read only memory (ROM) or a random access memory (RAM), and an input/output interface device.

Figure 3:
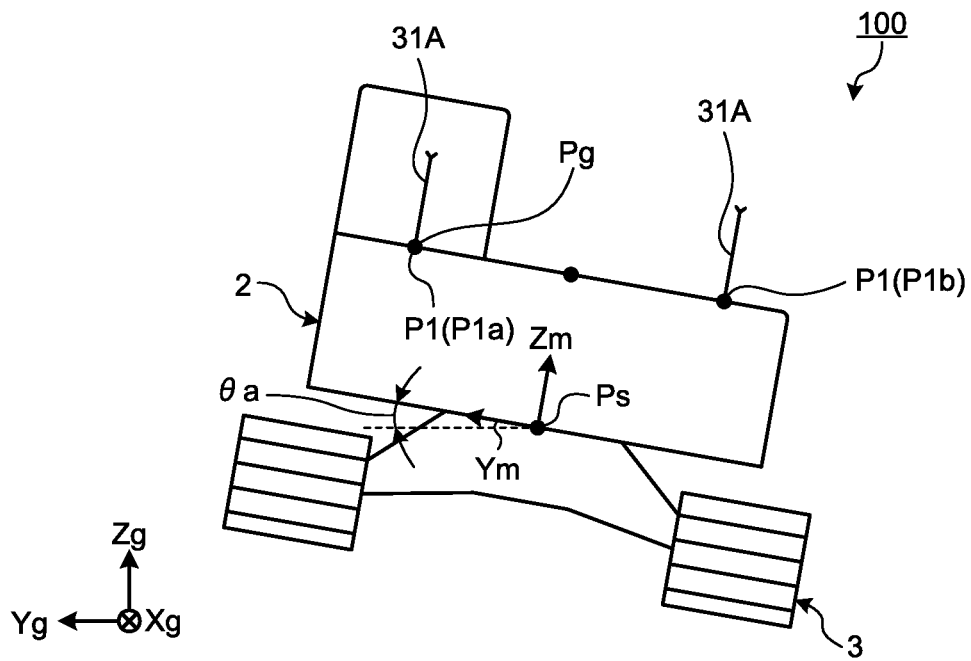
FIG. 3 is a rear view schematically illustrating an example of the construction machine according to the present embodiment.

FIG. 2 is a side view schematically illustrating the excavator 100 according to the present embodiment. FIG. 3 is a rear view schematically illustrating the excavator 100 according to the present embodiment.

As illustrated in FIG. 2, the excavator 100 has a bucket cylinder stroke sensor 14 arranged in the bucket cylinder 21, an arm cylinder stroke sensor 15 arranged in the arm cylinder 22, and a boom cylinder stroke sensor 16 arranged in the boom cylinder 23. The bucket cylinder stroke sensor 14 detects a bucket cylinder length which is the stroke length of the bucket cylinder 21. The arm cylinder stroke sensor 15 detects an arm cylinder length which is the stroke length of the arm cylinder 22. The boom cylinder stroke sensor 16 detects a boom cylinder length which is the stroke length of the boom cylinder 23.

As illustrated in FIGS. 2 and 3, the excavator 100 has imaging devices 30 provided to the upper swinging body 2, a position detector 31 for detecting the position of the upper swinging body 2 defined in a global coordinate system, an attitude detector 32 for detecting the attitude of the upper swinging body 2, an azimuth detector 33 for detecting the azimuth of the upper swinging body 2, a tooth position detector 34 for detecting the position of the teeth 10 of the bucket 11, and a transmitter 35 that transmits a radio wave including specific data for specifying the upper swinging body 2.

The global coordinate system (Xg, Yg, Zg coordinate system) is a coordinate system indicating the absolute position defined by the global positioning system (GPS). A local coordinate system (Xm, Ym, Zm coordinate system) is a vehicle body coordinate system indicating the relative position using the upper swinging body 2 of the excavator 100 as a reference position Ps. The reference position Ps of the upper swinging body 2 is, for example, set to the swinging center RX of the upper swinging body 2. Note that the reference position Ps of the upper swinging body 2 may be set at the rotation axis AX3.

The position detector 31 detects the three-dimensional position of the upper swinging body 2 defined in the global coordinate system. The attitude detector 32 detects the tilt angle of the upper swinging body 2 with respect to the horizontal plane (Xg-Yg plane). The azimuth detector 33 detects the azimuth of the upper swinging body 2 with respect to the reference azimuth.

The position detector 31 includes a GPS receiver. The position detector 31 detects the three-dimensional position of the upper swinging body 2 defined in the global coordinate system. The position detector 31 detects the position in the Xg direction, the position in the Yg direction, and the position in the Zg direction of the upper swinging body 2.

A plurality of GPS antennas 31A is provided to the upper swinging body 2. A GPS antenna 31A receives a radio wave from the GPS satellites and outputs a signal based on the received radio wave to the position detector 31. Based on the signal supplied from the GPS antenna 31A, the position detector 31 detects an installation position P1 of the GPS antenna 31A defined in the global coordinate system. The position detector 31 detects an absolute position Pg of the upper swinging body 2 on the basis of the installation position P1 of the GPS antenna 31A.

Two GPS antennas 31A are provided in the vehicle width direction. The position detector 31 detects each of an installation position P1a of one of the GPS antennas 31A and an installation position P1b of the other GPS antenna 31A. The position detector 31 performs arithmetic processing based on the installation position P1a and the installation position P1b to detect the absolute position Pg and the azimuth of the upper swinging body 2. In the present embodiment, the absolute position Pg of the upper swinging body 2 is the installation position P1a. Note that the absolute position Pg of the upper swinging body 2 may be the installation position P1b.

The attitude detector 32 includes an inertial measurement unit (IMU). The attitude detector 32 is provided to the upper swinging body 2. The attitude detector 32 is arranged, for example, under the cab 4. As described above, the attitude detector 32 detects the attitude of the upper swinging body 2. The attitude of the upper swinging body 2 includes the tilt angle of the upper swinging body 2 with respect to the horizontal plane. The tilt angle of the upper swinging body 2 with respect to the horizontal plane includes a tilt angle $\theta a$ of the upper swinging body 2 in the vehicle width direction and the tilt angle $\theta b$ of the upper swinging body 2 in the anteroposterior direction.

The azimuth detector 33 detects the azimuth of the upper swinging body 2 with respect to the reference azimuth defined in the global coordinate system based on the installation position P1a of the one GPS antenna 31A and the installation position P1b of the other GPS antenna 31A. The reference azimuth is, for example, north. The azimuth detector 33 performs arithmetic processing based on the installation position P1a and the installation position P1b and detects the azimuth of the upper swinging body 2 with respect to the reference azimuth. The azimuth detector 33 calculates a linear line connecting the installation position P1a and the installation position P1b and detects the azimuth of the upper swinging body 2 with respect to the reference azimuth based on the angle formed by the calculated linear line and the reference azimuth.

Note that the azimuth detector 33 may detect the azimuth of the upper swinging body 2 using a magnetic sensor.

The tooth position detector 34 detects the relative position of the teeth 10 with respect to the reference position Ps of the upper swinging body 2. In the present embodiment, the tooth position detector 34 calculates the relative position of the teeth 10 with respect to the reference position Ps of the upper swinging body 2 on the basis of a detection result of the bucket cylinder stroke sensor 14, a detection result of the arm cylinder stroke sensor 15, a detection result of the boom cylinder stroke sensor 16, the length L11 of the bucket 11, the length L12 of the arm 12, and the length L13 of the boom 13.

The tooth position detector 34 calculates a tilt angle $\theta 11$ of the teeth 10 of the bucket 11 with respect to the arm 12 on the basis of the bucket cylinder length detected by the bucket cylinder stroke sensor 14. The tooth position detector 34 calculates a tilt angle $\theta 12$ of the arm 12 with respect to the boom 13 on the basis of the arm cylinder length detected by the arm cylinder stroke sensor 15. The tooth position detector 34 calculates a tilt angle $\theta 13$ of the boom 13 with respect to the Z axis of the upper swinging body 2 on the basis of the boom cylinder length detected by the boom cylinder stroke sensor 16.

The length L11 of the bucket 11 is a distance between the teeth 10 of the bucket 11 and the rotation axis AX1 (bucket pin 11P). The length L12 of the arm 12 is a distance between the rotation axis AX1 (bucket pin 11P) and the rotation axis AX2 (arm pin 12P). The length L13 of the boom 13 is a distance between the rotation axis AX2 (arm pin 12P) and the rotation axis AX3 (boom pin 13P).

The tooth position detector 34 calculates the relative position of the teeth 10 with respect to the reference position Ps of the upper swinging body 2 on the basis of the tilt angle $\theta 11$, the tilt angle $\theta 12$, the tilt angle $\theta 13$, the length L11, the length L12, and the length L13.

The tooth position detector 34 calculates an absolute position Pb the teeth 10 on the basis of the absolute position Pg of the upper swinging body 2 detected by the position detector 31 and a relative position of the teeth 10 to the reference position Ps of the upper swinging body 2. The absolute position Pg and the relative position to the reference position Ps is known data derived from specification data of the excavator 100. Therefore, the tooth position detector 34 is capable of calculating the absolute position Pb of the teeth 10 on the basis of the absolute position Pg of the upper swinging body 2, the relative position of the teeth 10 to the reference position Ps of the upper swinging body 2, and the specification data of the excavator 100.

Note that the tooth position detector 34 may include an angle sensor such as a potentiometer or a tiltmeter. The angle sensor may detect the tilt angle $\theta 11$ of the bucket 11, the tilt angle $\theta 12$ of the arm 12, and the tilt angle $\theta 13$ of the boom 13.

The transmitter 35 is mounted on the upper swinging body 2. The transmitter 35 transmits a radio wave including specific data of the excavator 100. In the present embodiment, the transmitter 35 is a beacon terminal. A beacon terminal can transmit a radio wave including specific data.

Figure 4:
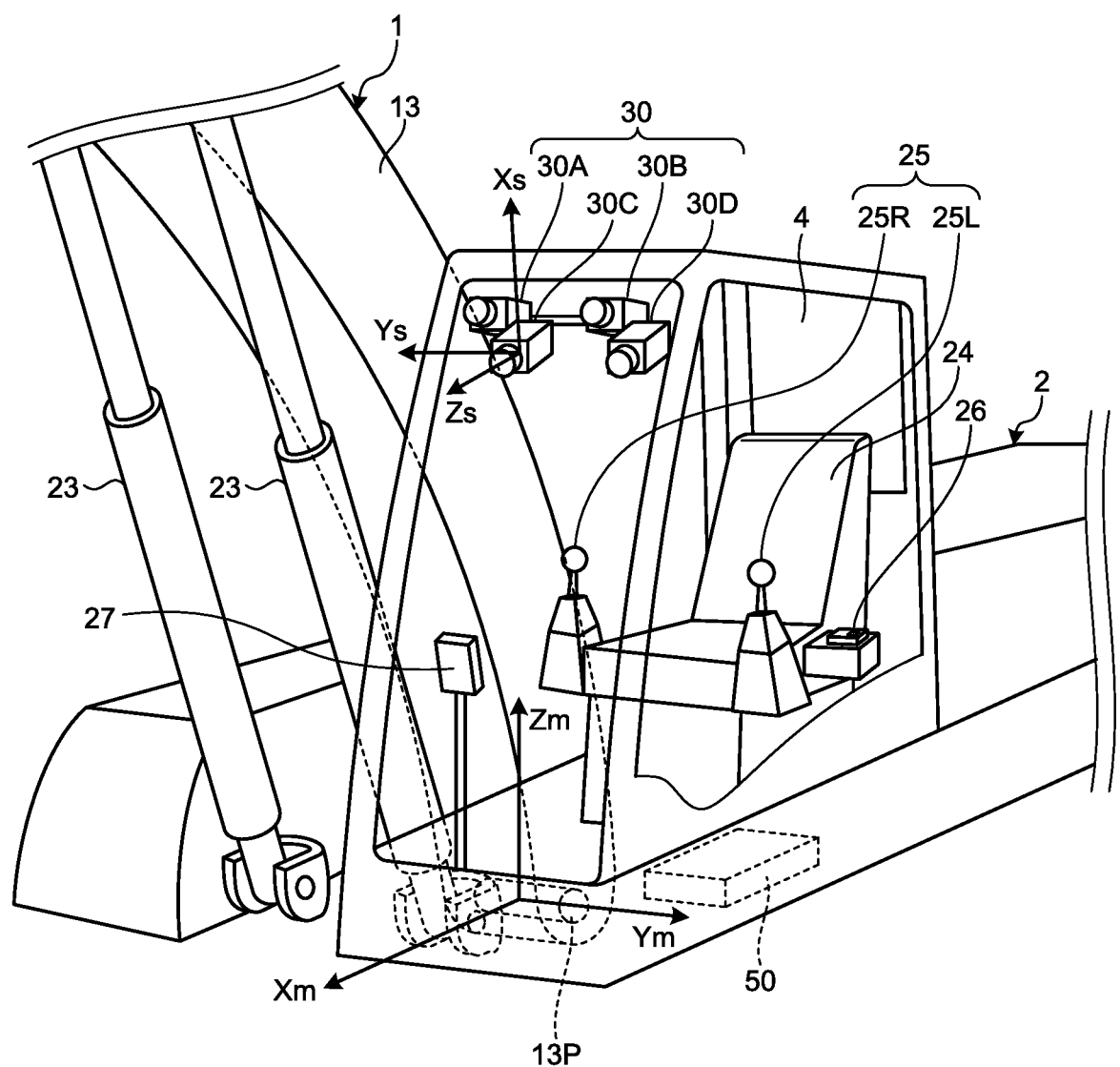
FIG. 4 is a perspective view illustrating a vicinity of a cab of the construction machine according to the present embodiment.

FIG. 4 is a perspective view of the vicinity of the cab 4 of the excavator 100 according to the present embodiment when viewed from the front side of the upper swinging body 2. As illustrated in FIG. 4, the excavator 100 has a driver's seat 24 on which a driver sits, operating devices 25 for operating the work machine 1, an operating device 26 for operating the imaging devices 30, a display device 27 capable of displaying display data, and imaging devices 30 each capable of acquiring two-dimensional image data. The driver's seat 24, the operating devices 25, the operating device 26, and the display device 27 are arranged in the cab 4. The imaging devices 30 are provided at the front part of the upper swinging body 2. Note that the position where the imaging devices 30 are included may not be the front part of the upper swinging body 2. It is only required that the imaging devices 30 provided at a position where imaging ahead of the excavator 100 can be performed.

The operating devices 25 include an operation member operated by a driver of the excavator 100. The operation member includes an operation lever or a joystick. In the present embodiment, the operating devices 25 include a right operation lever 25R and a left operation lever 25L. By operating the operating devices 25, the work machine 1 or the upper swinging body 2 is operated.

The operating device 26 includes an operation member operated by a driver of the excavator 100. The operation member includes a push button switch. In the present embodiment, imaging by the imaging devices 30 is performed by operating the operating device 26. The operating device 26 includes an informing unit for informing the driver that the imaging devices 30 and the control device 50 are in a state where an operation signal of the operating device 26 can be accepted. In the present embodiment, the informing unit is a light emitting diode (LED) lamp. When the LED lamp is on, an operation signal of the operating device 26 is accepted by the imaging devices 30 and the control device 50. When the LED lamp is off, an operation signal of the operating device 26 cannot be accepted by the imaging devices 30 and the control device 50.

The display device 27 includes a flat panel display such as a liquid crystal display (LCD) or an organic electroluminescence display (OLED). Note that the display device 27 may be a touch panel.

An imaging device 30 is capable of acquiring two-dimensional image data outside the excavator 100. The imaging device 30 has optical elements such as a convex lens, a concave lens, and a concave-convex lens and an imaging element such as a couple charged device (CCD) image sensor or a complementary metal oxide semiconductor (CMOS) image sensor. The imaging device 30 acquires still image data outside the excavator 100. When the driver of the excavator 100 operates an operation member having a function as a shutter button, the imaging device 30 acquires still image data. In addition, the imaging device 30 is capable of successively acquiring a plurality of pieces of still image data at a predetermined sampling period. In the following description, a plurality of pieces of still image data acquired at a predetermined sampling period is referred to as continuous still image data as appropriate. Continuous still image data is continuously acquired even if the shutter button is not operated.

At least two imaging devices 30 are provided. The pair of imaging devices 30 forms a stereo camera system. In the present embodiment, the imaging devices 30 includes an imaging device 30A, an imaging device 30B, an imaging device 30C, and an imaging device 30D. The imaging device 30A and the imaging device 30B form a first stereo camera system. The imaging device 30C and the imaging device 30D constitute a second stereo camera system.

The imaging devices 30 (30A, 30B, 30C, and 30D) are arranged at a front and upper part of the cab 4. Moreover, the imaging devices 30 are arranged, for example, inside the cab 4 and inside a front glass of the cab 4. The imaging devices 30 are arranged such that an incident surface of an optical element of the imaging device 30 faces ahead of the upper swinging body 3. As a result, the imaging devices 30 can image an object present ahead of the upper swinging body 2. In the present embodiment, an object imaged by the imaging device 30 includes a construction object at a construction site.

The imaging device 30A and the imaging device 30B are arranged while spaced in the vehicle width direction such that an optical axis of an optical element of the imaging device 30A and an optical axis of an optical element of the imaging device 30B are parallel, for example. In other words, the imaging device 30A and the imaging device 30B are arranged so as to face the same direction. The imaging device 30A and the imaging device 30B image an object stereographically.

The imaging device 30C and the imaging device 30D are arranged while spaced in the vehicle width direction such that an optical axis of an optical element of the imaging device 30C and an optical axis of an optical element of the imaging device 30D are parallel, for example. In other words, the imaging device 30C and the imaging device 30D are arranged so as to face the same direction. The imaging device 30C and the imaging device 30D image an object stereographically.

As illustrated in FIG. 4, in the vehicle width direction, the imaging device 30A is closer to the work machine 1 than the imaging device 30B is. In the vehicle width direction, the imaging device 30C is closer to the work machine 1 than the imaging device 30D is. The imaging device 30A and the imaging device 30B are arranged so as to be substantially in a horizontal line. The imaging device 30O and the imaging device 30D are arranged so as to be substantially in a horizontal line.

In a state where the excavator 100 is arranged on a horizontal plane, the imaging devices 30A and 30B are fixed to the upper swinging body 2 such that the optical axes of the optical elements of the imaging devices 30A and 30B are parallel to the horizontal plane, for example.

In the state where the excavator 100 is arranged on the horizontal plane, the imaging devices 30C and 30D are fixed to the upper swinging body 2 such that the optical axes of the optical elements of the imaging devices 30C and 30D are tilted downward, for example, facing ahead of the upper swinging body 2. The imaging devices 30C and 30D are fixed to the upper swinging body 2 such that two-dimensional image data of a construction object is in the field of view of the optical elements thereof when the construction object is excavated by the bucket 11. That is, by the first stereo camera system and the second stereo camera system, objects in a wide range of at least upper and lower ranges from the excavator 100 can be imaged.

In the present embodiment, an imaging device coordinate system ($X_s$-$Y_s$-$Z_s$ coordinate system) is defined. The imaging device coordinate system is a coordinate system indicating a relative position using a specific imaging device 30 among the plurality of imaging devices 30 as a reference position (origin). In the present embodiment, an imaging device 30 with which the reference position of the imaging device coordinate system is defined is the imaging device 30C. The reference position of the imaging device coordinate system is defined, for example, as the optical axis of the optical element of the imaging device 30C. Note that the reference position may be set at the center of the imaging element of the imaging device 30C.

<Control System and Construction Management System>

Figure 5:
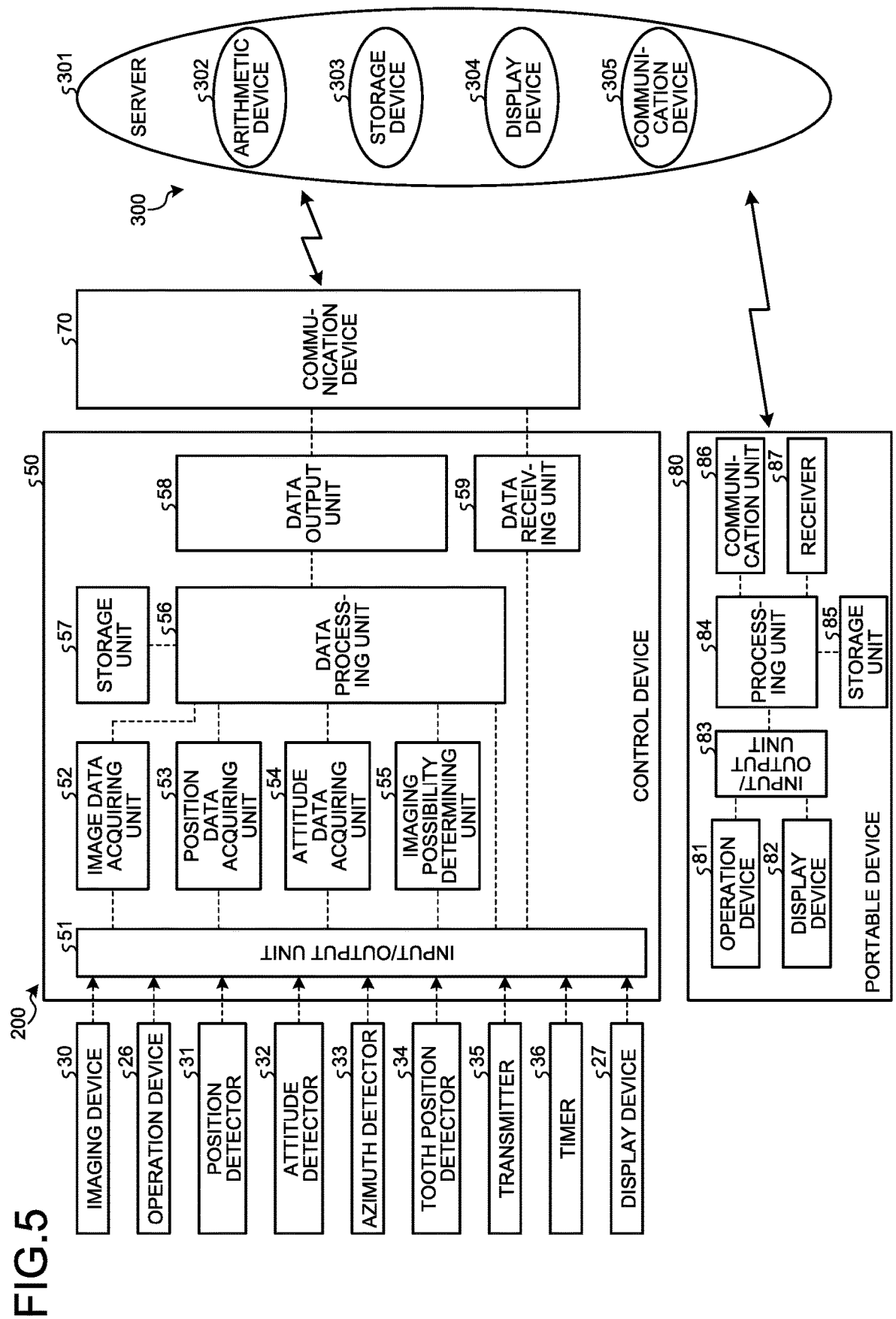
FIG. 5 is a functional block diagram illustrating an example of a construction management system including a control system of the construction machine according to the present embodiment.

FIG. 5 is a functional block diagram illustrating an example of a control system 200 and a construction management system 300 of the excavator 100 according to the present embodiment. As illustrated in FIG. 5, the control system 200 of the excavator 100 includes the imaging devices 30 (30A, 30B, 30C, and 30D), the operating device 26 for operating the imaging devices 30, the position detector 31 for detecting the position of the upper swinging body 2, the attitude detector 32 for detecting the attitude of the upper swinging body 2, the azimuth detector 33 for detecting the azimuth of the upper swinging body 2, the tooth position detector 34 for detecting the position of the teeth 10, the transmitter 35 for transmitting a radio wave including specific data of the upper swinging body 2, a timer 36 for measuring time, the display device 27, the control device 50, and a communication device 70.

The construction management system 300 has a server 301. The excavator 100 can wirelessly communicate with the construction management system 300 via the communication device 70. Furthermore, the construction management system 300 can wirelessly communicate with a portable device 80. The portable device 80 includes a portable computer such as a smartphone or a personal computer of a tablet type.

The control device 50 includes an input/output unit 51, an image data acquiring unit 52, a position data acquiring unit 53, an attitude data acquiring unit 54, an imaging possibility determining unit 55, a data processing unit 56, a storage unit 57, a data output unit 58, and a data receiving unit 59.

The processor of the control device 50 handles functions of the image data acquiring unit 52, the position data acquiring unit 53, the attitude data acquiring unit 54, the imaging possibility determining unit 55, the data processing unit 56, the data output unit 58, and the data receiving unit 59. The storage device of the control device 50 handles a function of the storage unit 57. The input/output interface device of the control device 50 handles a function of the input/output unit 51.

The input/output unit 51 performs transmission and reception of signals and data to and from each of the imaging device 30, the operating device 26, the position detector 31, the attitude detector 32, the azimuth detector 33, the tooth position detector 34, the transmitter 35, the timer 36, and the display device 27.

The image data acquiring unit 52 acquires two-dimensional image data outside the vehicle acquired by the plurality of imaging devices 30 (30A, 30B, 30C, and 30D). Two-dimensional image data outside the vehicle includes still image data. The image data acquiring unit 52 supplies the two-dimensional image data outside the vehicle acquired by the plurality of imaging devices 30 to the data processing unit 56.

The position data acquiring unit 53 acquires position data indicating the absolute position of the upper swinging body 2 acquired by the position detector 31. The position data acquiring unit 53 supplies the position data of the upper swinging body 2 acquired by the position detector 31 to the data processing unit 56.

The attitude data acquiring unit 54 acquires attitude data indicating the attitude of the upper swinging body 2 acquired by the attitude detector 32. Furthermore, the attitude detector 32 includes the IMU and thus is capable of detecting the movement of the upper swinging body 2. The attitude data acquiring unit 54 supplies the attitude data including the motion of the upper swinging body 2 acquired by the attitude detector 32 to the data processing unit 56.

The imaging possibility determining unit 55 allows operation of the operating device 26 on the basis of a detection signal of the attitude detector 32. When the imaging possibility determining unit 55 determines that the upper swinging body 2 is stationary on the basis of a detection signal of the attitude detector 32, the imaging possibility determining unit 55 allows operation of the operating device 26 and causes the imaging devices 30 to be in a state where an operation signal of the operating device 26 can be accepted. When the imaging possibility determining unit 55 determines that the upper swinging body 2 is moving on the basis of a detection signal of the attitude detector 32, the imaging possibility determining unit 55 prohibits operation of the operating device 26 and causes the imaging devices 30 to be in a state where an operation signal of the operating device 26 cannot be accepted.

The data processing unit 56 performs image processing on the two-dimensional image data outside the vehicle acquired by the plurality of imaging devices 30 to generate three-dimensional image data. In the present embodiment, the data processing unit 56 performs image processing on the still image data outside the vehicle to generate three-dimensional image data. Note that the data processing unit 56 may generate three-dimensional image data by performing image processing on continuous still image data outside the vehicle. The data processing unit 56 performs image processing by a stereo method on the two-dimensional image data of the same object at a construction site acquired by a pair of imaging devices 30 to generate three-dimensional image data of the object. The three-dimensional image data generated by the data processing unit 56 is, for example, three-dimensional topographic data of the construction site.

The storage unit 57 stores a computer program for causing the data processing unit 56 to execute processing. The data processing unit 57 executes processing according to a computer program stored in the storage unit 57.

The storage unit 57 further stores unique data of the excavator 100. The unique data of the excavator 100 includes identification data for identifying the excavator 100. The unique data includes, for example, a production serial number of the excavator 100. Note that the unique data may include unique data of the imaging devices 30 mounted to the excavator 100. The unique data of an imaging device 30 includes, for example, a production serial number of the imaging device 30.

The server 301 can wirelessly communicate with the control device 50 of the excavator 100 via the communication device 70 via the Internet. The control device 50 is assigned with identification data (identification number) such as an internet protocol address (IP address). The control device 50 of the excavator 100 and the imaging devices 30 included in the excavator 100 are associated with each other. In the server 301, identification data of a control device 50 of each of a plurality of excavators 100 is registered. On the basis of the identification data, the server 301 can determine by imaging devices 30 of which excavator 100 the two-dimensional image data or the three-dimensional image data acquired via the Internet has been generated.

In the following description, data including one or both of two-dimensional image data and three-dimensional image data is referred to as display data as appropriate. That is, display data includes at least one of data including two-dimensional image data, data including three-dimensional image data, and data including both of two-dimensional image data and three-dimensional image data. In the present embodiment, the two-dimensional image data and the three-dimensional image data in the display data are still image data. The display data is data to be displayed on a specific display device. The display data is data associated with the excavator 100 (vehicle body 2).

The display data further includes data at the time of imaging by the imaging devices 30. The data at the time of imaging by the imaging devices 30 is data acquired when the imaging devices 30 acquiring the two-dimensional image data that is the basis of the display data acquire the two-dimensional image data. Timings when the imaging devices 30 acquire two-dimensional image data include at least one of a timing when the operating device 26 is operated and a timing when the image data acquiring unit 52 acquires the two-dimensional image data from the imaging device 30. Examples of timings when the imaging devices 30 acquire the two-dimensional image data include a timing when an operation signal generated by the operating device 26 as a result of the operating device 26 being operated is input to the data processing unit 56 via the input/output unit 51. The data processing unit 56 can determine the timing when the imaging devices 30 acquires the two-dimensional image data on the basis of the timing when the two-dimensional image data is supplied from the image data acquiring unit 52 or the timing when an operation signal is supplied from the operating device 26.

In the present embodiment, the data at the time of imaging by the imaging devices 30 includes at least one of position data of the excavator 100, attitude data of the excavator 100, and time data at the time of imaging by the imaging devices 30. The data processing unit 56 acquires position data indicating an absolute position of the upper swinging body 2 at the time when the two dimensional image data has been acquired from the position detector 31 via the position data acquiring unit 53. The data processing unit 56 acquires attitude data including the attitude or the motion of the upper swinging body 2 at the time when the two-dimensional image data has been acquired from the attitude detector 32 via the attitude data acquiring unit 54. The data processing unit 56 acquires time data indicating the time point at which the two-dimensional image data has been acquired from the timer 36. Note that the time data may include a date when the two-dimensional image data has been acquired.

In the present embodiment, the data processing unit 56 adds the data at the time of imaging by the imaging devices 30 to at least one of the two-dimensional image data and the three-dimensional image data to generate display data.

The data output unit 58 outputs, from the control device 50, the display data generated by the data processing unit 56 to be displayed on a specific display device. The data output unit 58 outputs the display data associated with the excavator 100 or the imaging devices 30 included in the excavator 100 to a specific display device. In the present embodiment, the data output unit 58 outputs the display data to the communication device 70.

Furthermore, the data output unit 58 outputs, to the server 301, continuous still image data outside the vehicle acquired by the imaging devices 30 at a predetermined sampling period.

The data receiving unit 59 obtains a signal or data received by the communication device 70.

The communication device 70 can wirelessly communicate with the server 301 of the construction management system 300. The communication device 70 transmits the display data to the server 301. In the present embodiment, the communication device 70 transmits the display data to the server 301 via the Internet. Note that the communication device 70 may transmit the display data to the server 301 by using another communication form such as a mobile phone network or satellite communication.

The communication device 70 further transmits, to the server 301, the continuous still image data outside the vehicle acquired by the imaging devices 30 at a predetermined sampling period.

The server 301 includes a computer system. The server 301 includes an arithmetic device 302 including a processor such as a CPU, a storage device 303 including a memory and a storage unit such as a ROM or a RAM, a display device 304 including a flat panel display such as a liquid crystal display or an organic EL display, and a communication device 305.

The display data transmitted from the communication device 70 of the excavator 100 is received by the communication device 305 of the server 301. The display data received by the communication device 305 of the server 301 is stored in the storage device 303.

Furthermore, the server 301 can transmit the display data supplied from the excavator 100 to the portable device 80 via the communication device 305. Moreover, the server 301 can transmit continuous still image data supplied from the imaging devices 30 of the excavator 100 to the portable device 80 via the communication device 305.

The portable device 80 has an operating device 81, a display device 82, an input/output unit 83, a processing unit 84, a storage unit 85, a communication unit 86, and a receiving unit 87.

The operating device 81 includes an input device such as a touch panel or a keyboard. By operating the operation unit 81, an operation signal is generated.

The display device 82 includes a flat panel display such as a liquid crystal display or an organic EL display.

The input/output unit 83 includes an interface circuit that performs transmission and reception of signals or data among the operating device 81, display device 82, and the processing unit 84.

The processing unit 84 includes a processor such as a CPU. The storage unit 85 includes a memory and a storage unit such as a ROM or a RAM.

The communication unit 86 can wirelessly communicate with the server 301. The communication unit 86 can wirelessly communicate with the server 301 via the Internet. The communication unit 86 can receive display data from the server 301. The communication unit 86 can further transmit an operation signal generated by operating the operation unit 81 to the server 301.

The server 301 can wirelessly communicate with the processing unit 84 of the portable device 80 via the communication unit 86 via the Internet. Identification data such as an IP address or a mail address is assigned to the processing unit 86. In the server 301, identification data of a processing unit 86 of each of a plurality of portable devices 80 is registered. Based on the identification data, the server 301 can determine from which portable device 80 the operation signal acquired via the Internet has been supplied. Moreover, the server 301 can determine to which portable device 80 the display data to be transmitted on the basis of the identification data. That is, the server 301 can output the display data to the display device 82 of the portable device 80 associated with the identification data registered in the server 301. Note that the server 301 and the portable device 80 may wirelessly communicate using a mobile phone network, a satellite communication network, or the like.

The receiving unit 87 receives a radio wave from the transmitter 35 including a beacon terminal included in the excavator 100.

<Construction Management Method>

Figure 6:
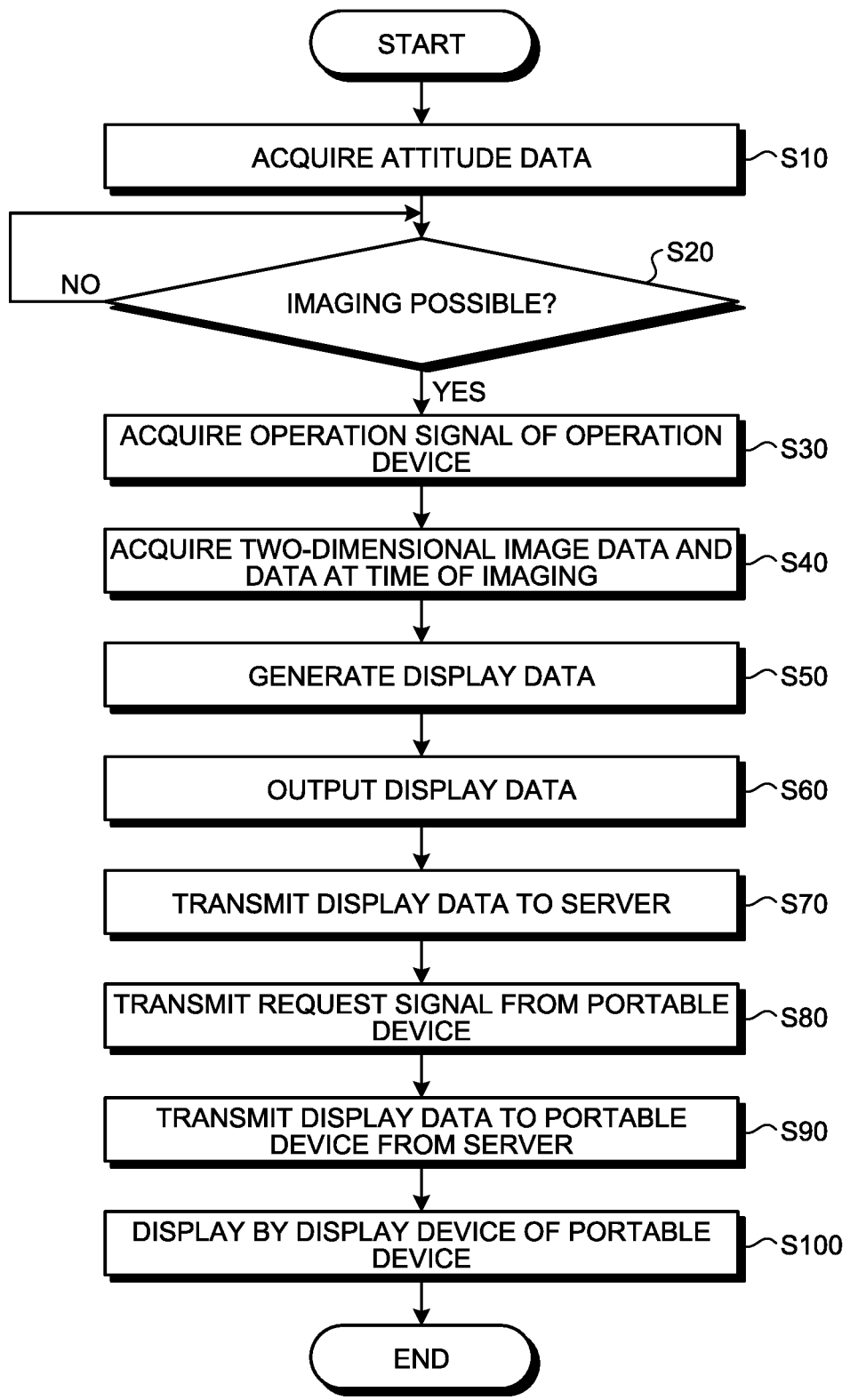
FIG. 6 is a flowchart illustrating an example of a construction management method according to the present embodiment.

Next, a construction management method according to the present embodiment will be described. FIG. 6 is a flowchart illustrating an example of the construction management method according to the present embodiment.

The excavator 100 operates at the construction site. The excavator 100 is operated by a driver on board the cab 4. During operation of the excavator 100, position data of the excavator 100 is acquired. During operation of the excavator 100, attitude data of the excavator 100 is further acquired (step S10).

The imaging devices 30 acquire continuous still image data outside the excavator 100. The continuous still image data acquired by the imaging devices 30 is transmitted to the server 301 at a predetermined sampling period. The continuous still image data acquired by the imaging devices 30 is successively transmitted to the portable device 80 in real time via the server 301. The display device 82 of the portable device 80 displays the continuous still image data acquired by the imaging device 30 in real time.

Based on a detection signal of the attitude detector 32, the imaging possibility determining unit 55 determines whether imaging by the imaging devices 30 is possible (step S20).

For example, the imaging devices 30 move or vibrate while the lower traveling body 3 is traveling or the upper swinging body 2 is swinging. When imaging by the imaging devices 30 is performed while the imaging devices 30 are moving or vibrating, there is a possibility that the imaging devices 30 are shaken and the quality of the acquired two-dimensional image data is deteriorated. The attitude detector 32 is capable of detecting the motion of the upper swinging body 2. When the upper swinging body 2 is moving, a detection signal of the attitude detector 32 increases or fluctuates greatly, for example. When the upper swinging body 2 is stationary, a detection signal of the attitude detector 32 becomes smaller, for example. The imaging possibility determining unit 55 can determine whether the upper swinging body 2 is stationary on the basis of the detection signal of the attitude detector 32.

The imaging possibility determining unit 55 monitors the detection signal of the attitude detector 32. When the detection signal of the attitude detector 32 is greater than or equal to a preset threshold value, since the upper swinging body 2 is moving and the imaging devices 30 are shaken, the imaging possibility determining unit 55 determines that imaging is impossible. When the detection signal of the attitude detector 32 is smaller than or equal to the threshold value, since the upper swinging body 2 substantially stationary and the imaging devices 30 are not shaken, the imaging possibility determining unit 55 determines that imaging is possible.

If it is determined in step S20 that imaging is impossible (step S20: No), the imaging possibility determining unit 55 prohibits operation of the operating device 26 and prohibits the imaging device 30 from accepting an operation signal of the operating device 26. When the imaging devices 30 cannot accept the operation signal of the operating device 26, the LED lamp included in the operating device 26 is turned off. With this, the driver of the excavator 100 can recognize that the imaging devices 30 cannot accept the operation signal of the operating device 26.

If it is determined in step S20 that imaging is possible (step S20: Yes), the imaging possibility determining unit 55 allows operation of the operating device 26 and allows the imaging device 30 to accept the operation signal of the operating device 26. When the imaging devices 30 can accept the operation signal of the operating device 26, the LED lamp included in the operating device 26 is turned on. With this, the driver of the excavator 100 can recognize that the imaging devices 30 can accept the operation signal of the operating device 26.

Note that, in the present embodiment, the imaging possibility determining unit 55 allows operation of the operating device 26 after a state where the detection signal of the attitude detector 32 is smaller than the threshold value has continued for a predetermined period of time (for example, 3 seconds).

After operation of the operating device 26 is allowed and the LED lamp of the operating device 26 is turned on, imaging by the imaging device 30 is performed, for example, for surveying the construction site. The driver of the excavator 100 operates the operating device 26. By operating the operating device 26, the operation signal generated by the operation signal 26 is sent to the input/output unit 51 of the control device 50. The input/output unit 51 acquires the operation signal of the operating device 26 (step S30).

When the operation signal of the operating device 26 is acquired by the input/output unit 51, the operation signal is supplied to each of the plurality of imaging devices 30A, 30B, 30C, and 30D. The plurality of imaging devices 30A, 30B, 30C, and 30D simultaneously acquire two-dimensional image data of an object at the construction site based on the supplied operation signal. In the present embodiment, the two-dimensional image data is still image data acquired by the imaging devices 30 when the operation member is operated. In the present embodiment, the two-dimensional image data is bitmap image data. The plurality of pieces of two-dimensional image data acquired by the respective imaging devices 30A, 30B, 30C, and 30D is acquired by the image data acquiring unit 52. In the present embodiment, four pieces of two-dimensional image data acquired by the four imaging devices 30A, 30B, 30C, and 30D are acquired by the image data acquiring unit 52. The image data acquiring unit 52 outputs the plurality of pieces of two-dimensional image data acquired by the plurality of imaging devices 30 to the data processing unit 56.

In addition, the input/output unit 51 acquires the data at the time of imaging acquired at the same time timing as the timing when the imaging devices 30 have acquired the two-dimensional image data. As described above, the data at the time of imaging includes at least one of position data of the excavator 1, attitude data of the excavator 1, and time data at the time of imaging by the imaging devices 30.

The data processing unit 56 acquires a plurality of pieces of two-dimensional image data and the two-dimensional image data (step S40).

The data processing unit 56 performs image processing on the two-dimensional image data acquired by the plurality of imaging devices 30 by a stereo method to generate three-dimensional image data. The three-dimensional image data is generated with reference to the position data of the upper swinging body 2. That is, the position of each bit forming the three-dimensional image data is defined by a coordinate based on the global coordinate system.

The data processing unit 56 further assigns the data at the time of imaging to one or both of the two-dimensional image data and the three-dimensional image data. In the present embodiment, the data at the time of imaging is assigned to both the two-dimensional image data and the three-dimensional image data. As a result, first display data including the two-dimensional image data and the data at the time of imaging and second display data including the three-dimensional image data and the data at the time of imaging are generated (step S50).

Note that, in the present embodiment, the data processing unit 56 corrects the generated three-dimensional image data on the basis of the attitude data. For example, in a case where the two-dimensional image data has been acquired in a state where the upper swinging body 2 has been inclined with respect to the horizontal plane, the generated three-dimensional image data is also inclined with respect to the horizontal plane. The data processing unit 56 corrects the inclination of the three-dimensional image data on the basis of the attitude data such that the generated three-dimensional image data becomes as if having been imaged by the excavator 100 in a state of being placed on a horizontal plane perpendicular to the direction of gravity.

The data output unit 58 outputs the display data generated by the data processing unit 56 to the communication device 70 (step S60). In a case where the three-dimensional image data has been corrected of inclination, the corrected three-dimensional image data is output from the data output unit 58.

The communication device 70 transmits the display data to the server 301 (step S70). The data processing unit 56 compresses the two-dimensional image data by, for example, the joint photographic experts group (JPEG) method to convert the data into a JPEG file. The communication device 70 transmits the compressed two-dimensional image data.

Server specific data for specifying the server 301 as a destination is stored in the storage unit 57 of the control device 50.

The communication device 305 of the server 301 receives the display data. The storage device 303 of the server 301 stores the received display data.

Figure 7:
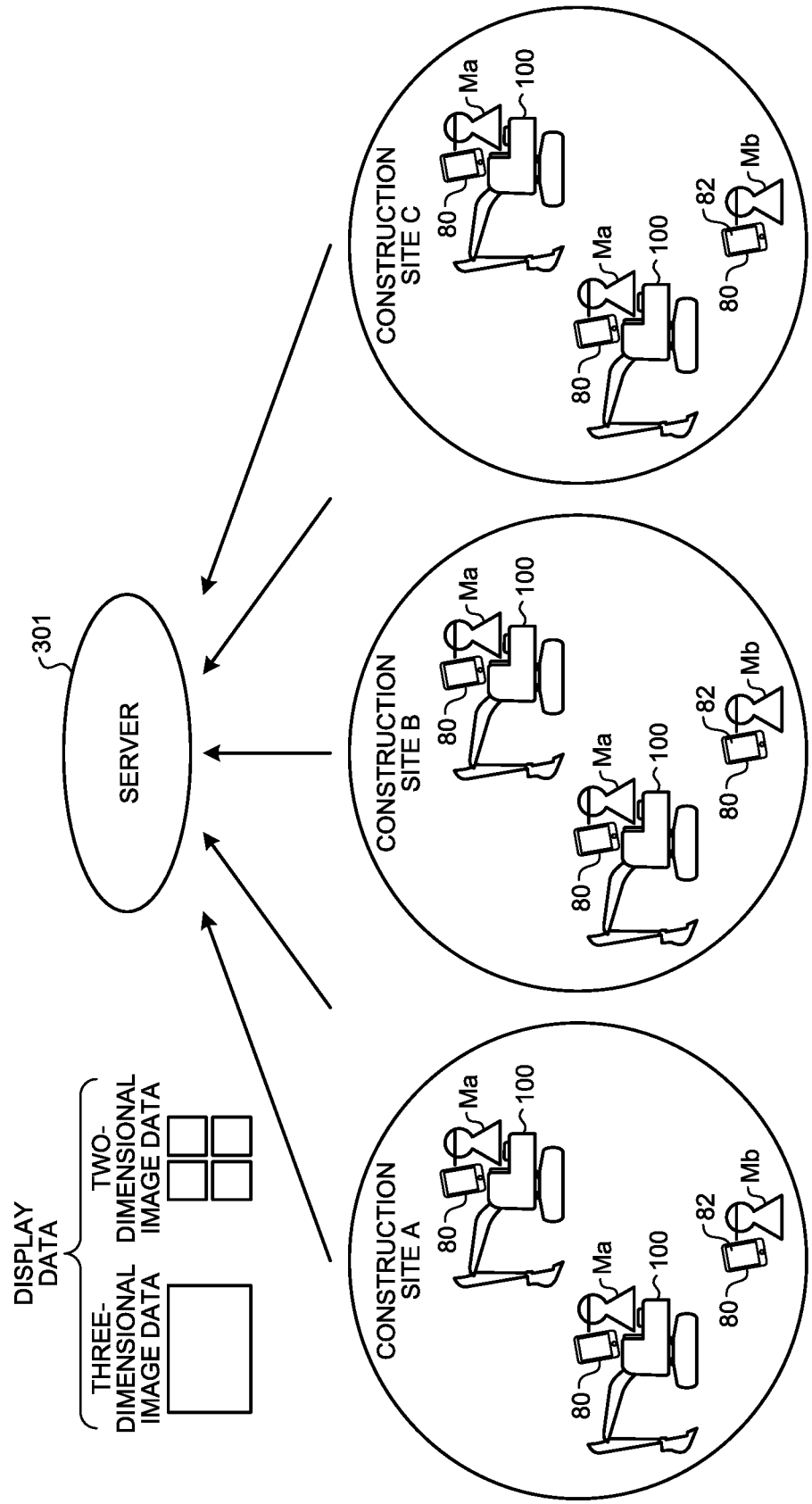
FIG. 7 is a diagram schematically illustrating an example of the construction management system according to the present embodiment.

FIG. 7 is a diagram schematically illustrating a state where the server 301 receives display data from a plurality of excavators 100. As illustrated in FIG. 7, the plurality of excavators 100 operate at a plurality of construction sites. Note that FIG. 7 is an merely an example, and at least one excavator 100 including the control system 200 and other components illustrated in FIG. 5 may operate at one construction site. The server 301 collects display data including at least one of two-dimensional image data and three-dimensional image data from the plurality of excavators 100. The collected display data is stored in the storage device 304 of the server 301.

Note that, in the present embodiment, IP addresses of control devices 50 of the excavators 100, display data of which is to be received, are registered in advance in the storage device 303 of the server 301. The arithmetic device 302 collates display data transmitted from an excavator 100 and received by the communication device 305 with the IP addresses registered in the storage device 303. The arithmetic device 302 accepts display data transmitted from any of the excavators 100 registered in the storage device 303. The display data transmitted from the excavator 100 is stored in the storage device 303.

As illustrated in FIG. 7, when a driver Ma of an excavator 100 or a worker Mb working at a construction site has a portable device 80, the portable device 80 is capable of displaying display data on a display device 82 included in the portable device 80.

When the display data is displayed on the display device 82, for example, an application software installed in the portable device 80 is activated. After the application software is activated and a startup screen is displayed on the display device 82, a login screen is displayed on the display device 82. A login account is assigned to the driver Ma or the worker Mb. The driver Ma or the worker Mb inputs authentication data such as identification information (ID) and a password while viewing the login screen.

When the display data is displayed on the display device 82 of the portable device 80, a request signal for requesting the display data is transmitted from the portable device 80 to the server 301 (step S80). In the present embodiment, the request signal is generated in the processing unit 84 when the operating device 81 of the portable device 80 is operated by the driver Ma or the worker Mb. When the operating device 81 of the portable device 80 is operated and the login account of the driver Ma or the worker Mb is input, the request signal is generated.

The generated request signal is transmitted to the server 301 via the communication unit 86.

Note that the processing of step S80 may not be performed. For example, identification data of portable devices 80 registered in the storage device 303 of the server 301 is associated with identification data of control devices 50 in advance, and when the server 301 receives display data, identification data (IP address) of a control device 50 having received together with the display data and the identification data (IP addresses) registered in the storage device 303 are collated. As a result of the collation, the server 301 extracts identification data (IP addresses) of portable devices 80 (display devices) associated with the received identification data (IP address) of the control device 50 from the storage device 303, and transmits the display data to the portable devices 80 corresponding to the identification data (IP addresses). That is, the display data output from the data output unit 58 is output to the portable devices 80 (display devices) based on a correspondence relationship between the construction machine (for example, the excavator 100) and the portable devices 80 (display devices). This correspondence relationship is stored in advance in the storage device 303 of the server 301.

In addition, the display data output from the data output unit 58 may be automatically transmitted to the portable devices 80 registered in the storage device 303 via the server 301. Note that, the display data output from the data output unit 58 may be transmitted to a portable device 80 via the server 301 on the basis of a request from a portable device 80 operated by a driver Ma or a worker Mb, that is, manually.

Furthermore, in the present embodiment, the continuous still image data acquired by the imaging devices 30 is successively transmitted to a portable device 80 in real time via the server 301 as described above. The display device 82 of the portable device 80 can display the continuous still image data, acquired by the imaging devices 30, in real time.

When the request signal is transmitted from the portable device 80 to the server 301 and the portable device 80 accesses the server 301, list data of a plurality of pieces of display data stored in the storage device 303 is transmitted from the server 301 to the portable device 80. The server 301 refers to identification data such as an IP address of the portable device 80 registered therein and transmits the list data to the portable device 80 having transmitted the request signal.

Figure 8:
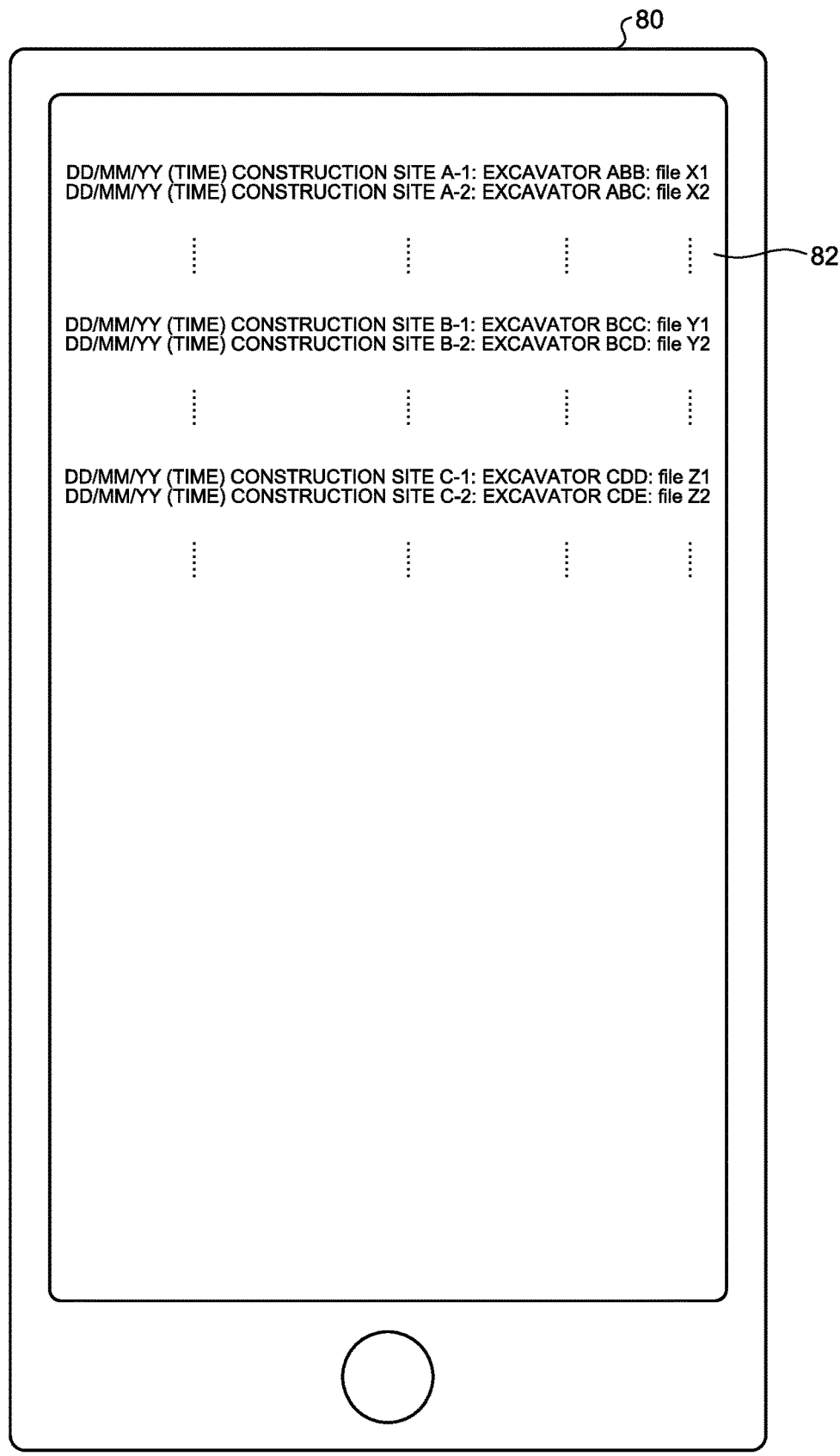
FIG. 8 is a diagram illustrating exemplary display of a display device according to the present embodiment.

FIG. 8 is a diagram schematically illustrating a state where the list data transmitted from the server 301 to the portable device 80 is displayed on the display device 82 of the portable device 80.

As illustrated in FIG. 8, for example time when two-dimensional image data has been acquired, a construction site where the two-dimensional image data has been acquired and a position at the construction site, an excavator 100 having acquired the two-dimensional image data, and a file name of the display data are displayed as the list data. The display data includes data specifying an excavator 100 and data at the time of imaging. Therefore, in addition to a file name of the display data, the display device 82 can display time and position at which two-dimensional image data has been acquired and an excavator 100 having acquired the two-dimensional image data as the list data.

Moreover, a latitude and a longitude of the position where the two-dimensional image data has been acquired may be displayed, or a name of the place where the two-dimensional image data has been acquired may be displayed as the list data. In addition, a thumbnail of the two-dimensional image data or three-dimensional image data may be displayed as the list data.

Furthermore, a list of construction sites associated to the login account may be displayed as the list data. For example, when a driver Ma or a worker Mb is in charge of a plurality of construction sites, a list of the plurality of construction sites may be displayed on the display device 82. When a driver Ma or a worker Mb selects a specific construction site out of the plurality of construction sites displayed on the display device 82, a list of a plurality of excavators 100 present at the selected construction site may be displayed on the display device 82.

The driver Ma or the worker Mb operates the operating device 81 and selects display data the driver Ma or the worker Mb intends to display on the display device 82 from the list data. For example, in a case where a list of the plurality of excavators 100 present at the construction site is displayed on the display device 82, the driver Ma or the worker Mb may select an excavator 100 having acquired image data that the driver Ma or the worker Mb intends to display on the display device 82 from the plurality of excavators 100 by operating the operating device 81. A request signal generated by operating the operating device 81 is transmitted to the server 301 via the communication unit 86. The server 301 transmits the selected display data to the display device 82 of the portable device 80 on the basis of the received request signal (step S90).

The display data transmitted from the server 301 is supplied to the processing unit 84 of the portable device 80 via the communication unit 86. The processing unit 84 displays the display data on the display device 82 of the portable device 80 (step S100).

Figure 9:
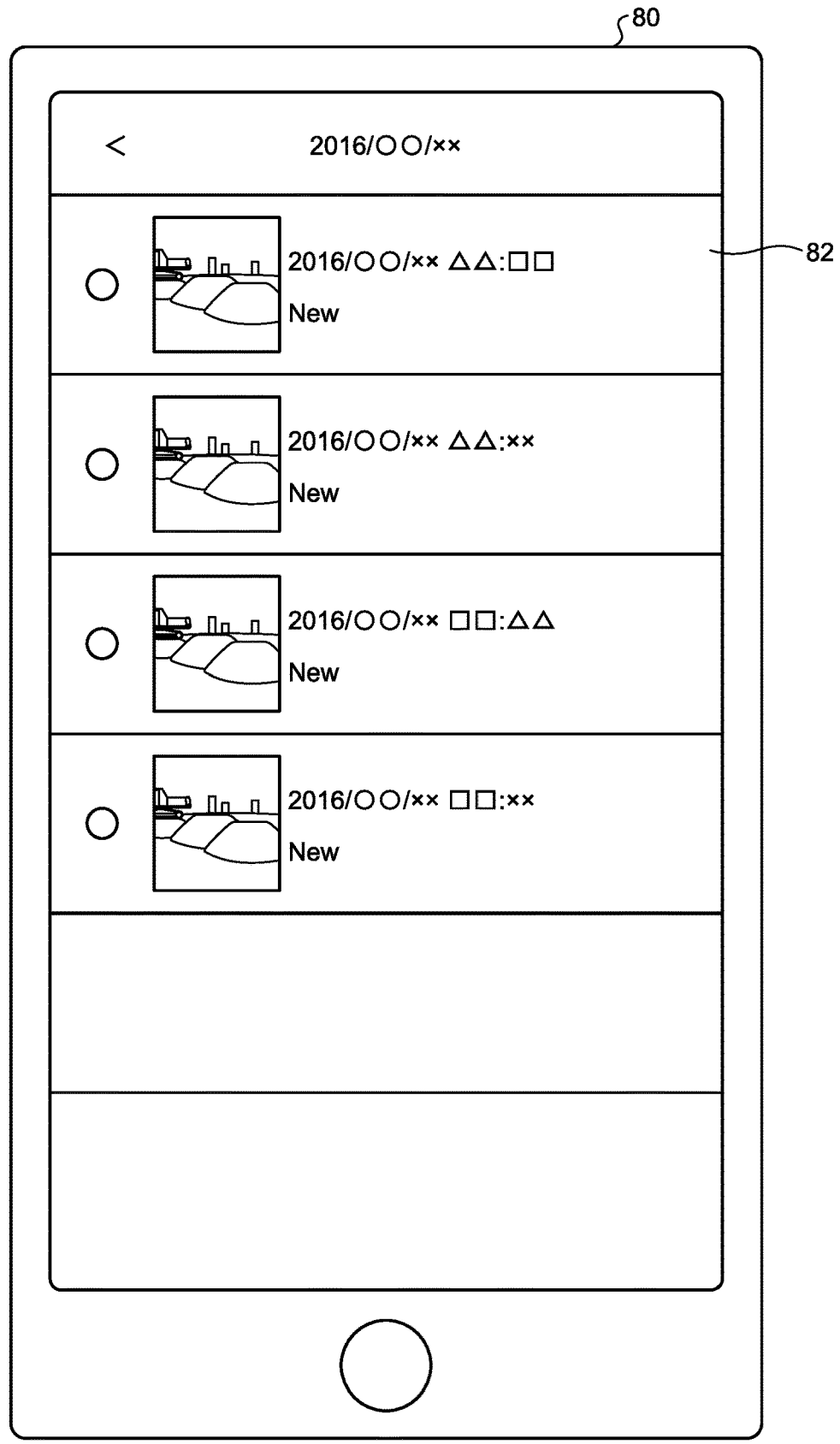
FIG. 9 is a diagram illustrating exemplary display of the display device according to the present embodiment.

FIG. 9 is a diagram illustrating an example in which thumbnails of two-dimensional image data are displayed on the display device 82. As illustrated in FIG. 9, thumbnails of a plurality of pieces of two-dimensional image data are displayed on the display device 82. In the example illustrated in FIG. 9, date and time when two-dimensional image data has been acquired are displayed together with a thumbnail of the two-dimensional image data. Note that, together with the thumbnail of the two-dimensional image data, a position where the two-dimensional image data has been acquired and a production serial number of the excavator 100 having acquired the two-dimensional image data may be displayed on the display device 82.

In addition, a thumbnail of three-dimensional image data is displayed on the display device 82.

Figure 10:
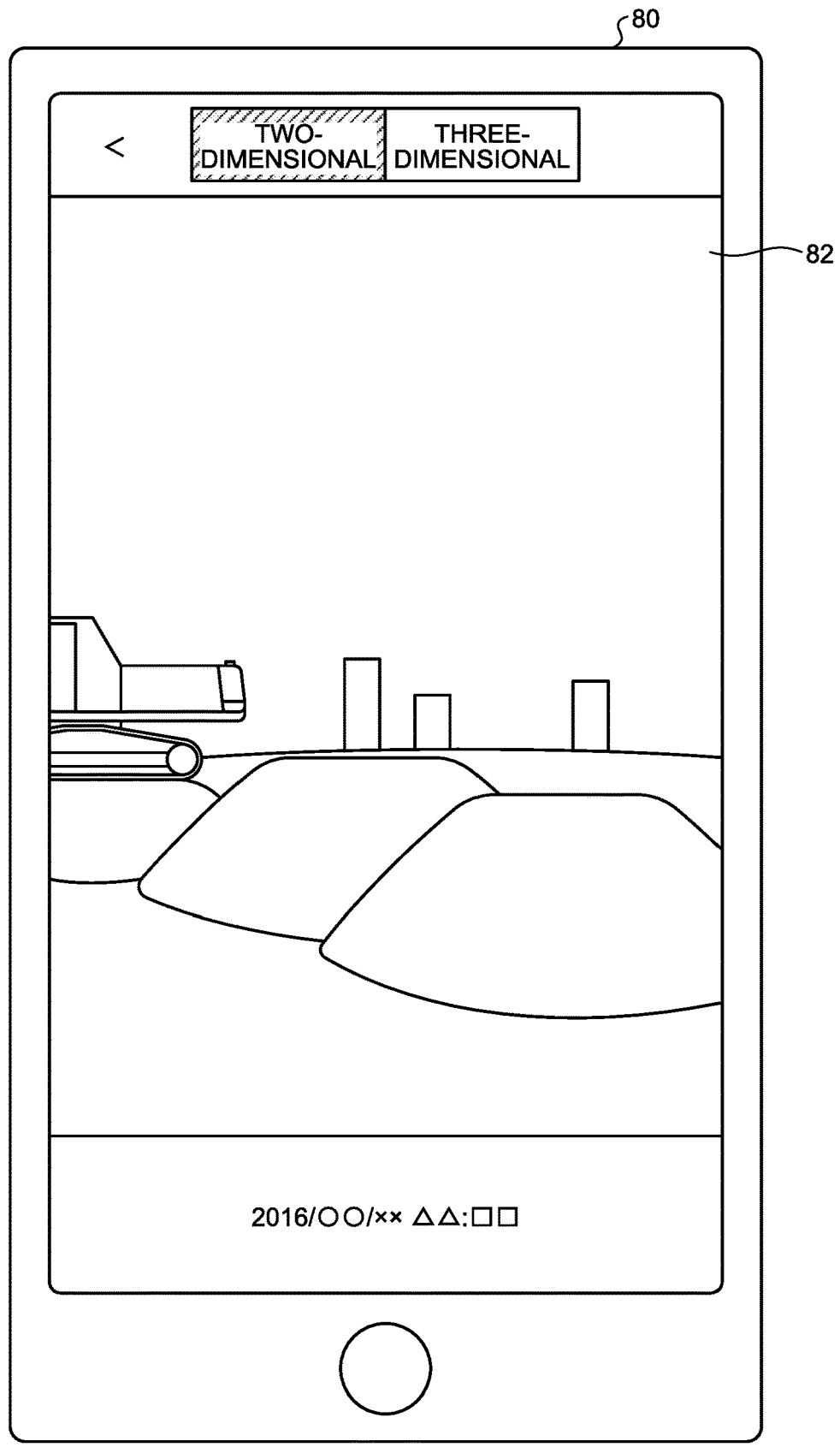
FIG. 10 is a diagram illustrating exemplary display of the display device according to the present embodiment.
Figure 11:
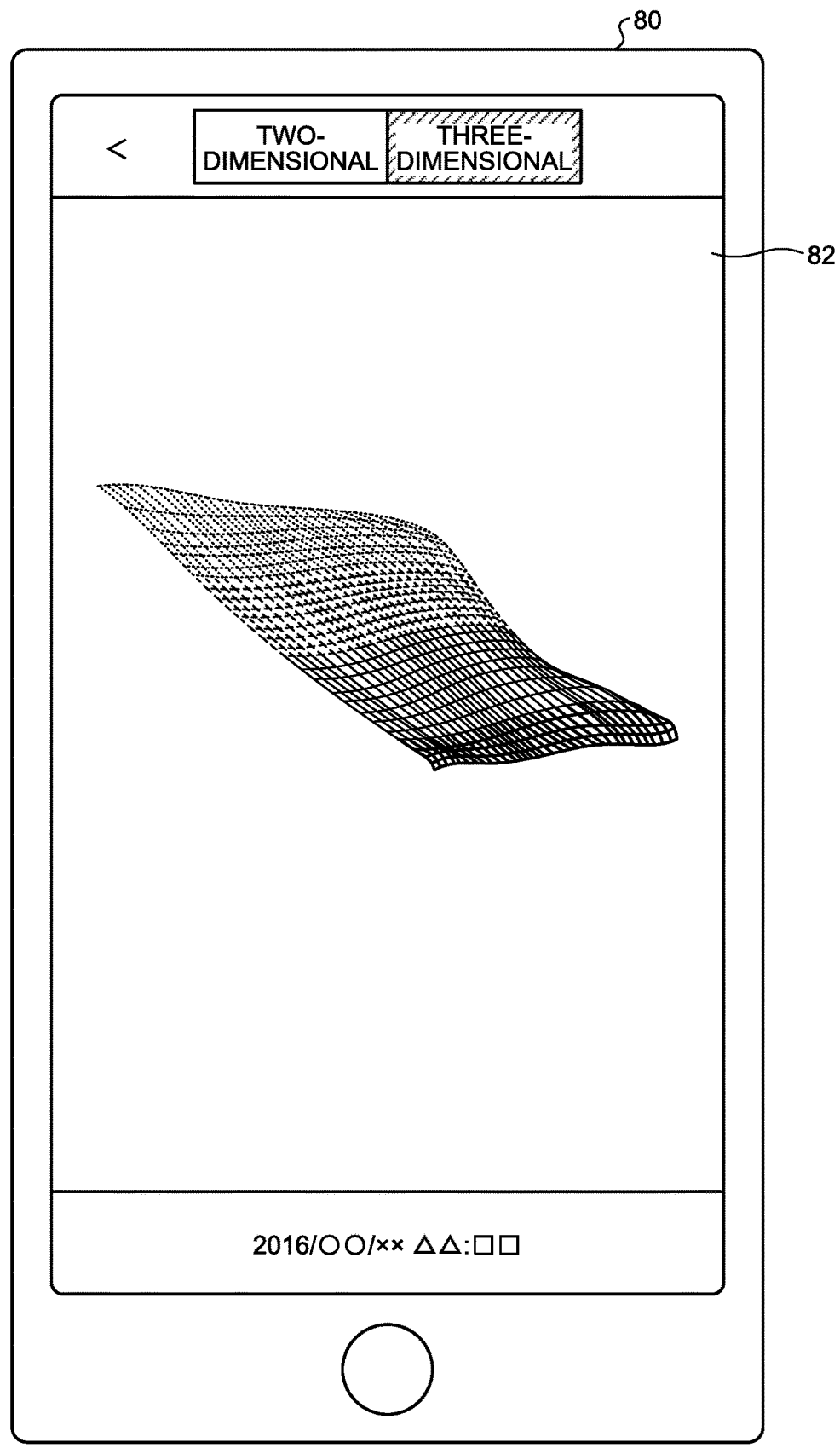
FIG. 11 is a diagram illustrating exemplary display of the display device according to the present embodiment.

FIGS. 10 and 11 are diagrams illustrating examples of display data displayed on the display device 82. When the driver Ma or the worker Mb selects certain image data from the thumbnails illustrated in FIG. 9, at least one of display data illustrated in FIG. 10 and display data illustrated in FIG. 11 is displayed on the display device 82.

FIG. 10 is a diagram illustrating an example in which two-dimensional image data is displayed as display data. FIG. 11 is a diagram illustrating an example in which three-dimensional image data is displayed as display data. As illustrated in FIGS. 10 and 11, indicators of "two-dimensional" and "three-dimensional" are displayed on an upper part of a display screen of the display device 82. When the driver Ma or the worker Mb instructs to display the two-dimensional image data, the indicator of "two-dimensional" is selected, and the two-dimensional image data is displayed as illustrated in FIG. 10. When the driver Ma or the worker Mb instructs to display the three-dimensional image data, the indicator of "three-dimensional" is selected, and the three-dimensional image data is displayed as illustrated in FIG. 11.

Furthermore, as illustrated in FIG. 10, data indicating time of imaging, which is data at the time of imaging, is displayed on the display device 82 together with the two-dimensional image data. Note that, together with the two-dimensional image data, data indicating a place of imaging (construction site and the ground) and a production serial number of the excavator 100 having acquired the two-dimensional image data may be displayed on the display device 82.

Figure 12:
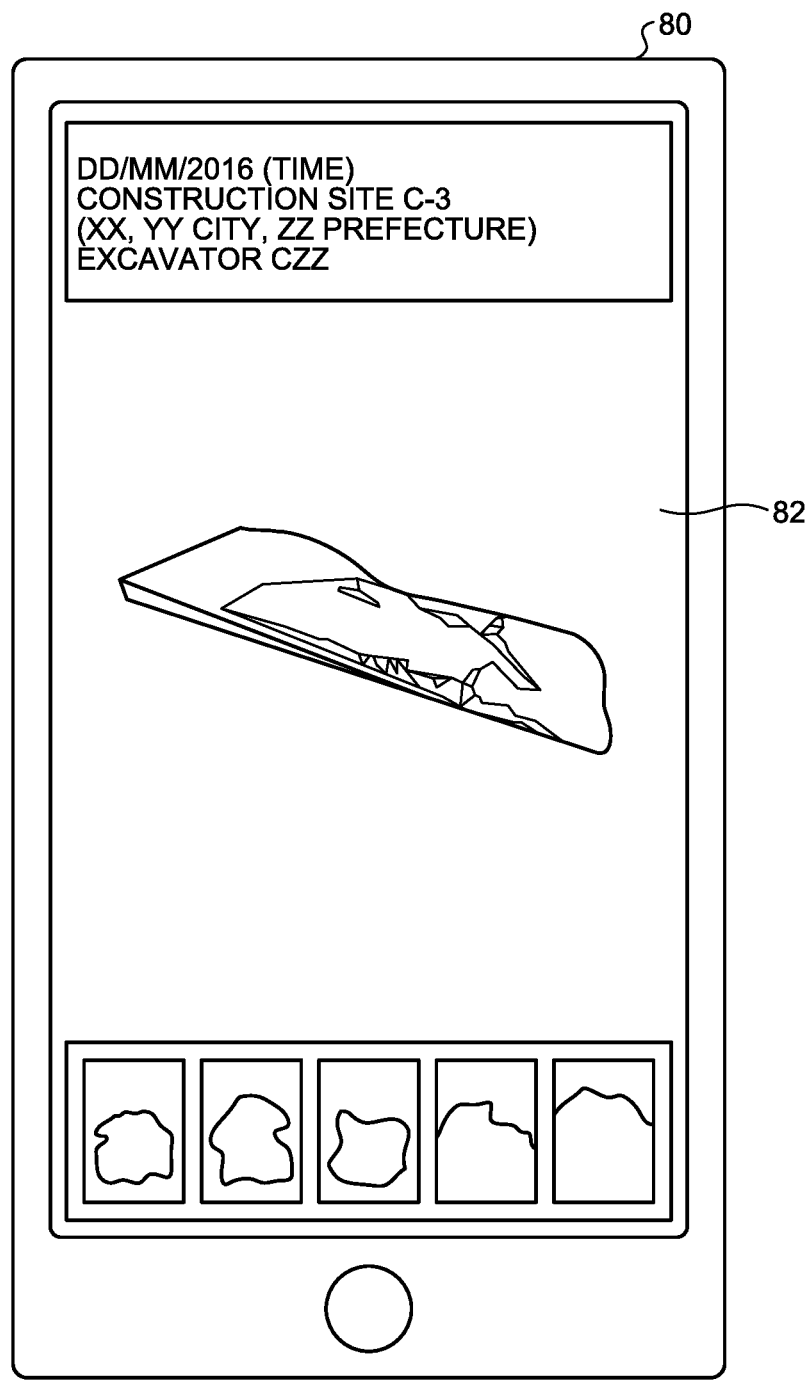
FIG. 12 is a diagram illustrating exemplary display of the display device according to the present embodiment.

FIGS. 11 and 12 are diagrams illustrating examples of display data displayed on the display device 82. FIGS. 11 and 12 are diagrams illustrating examples in which three-dimensional image data is displayed as display data.

As illustrated in FIG. 11, three-dimensional image data of a part of a construction site may be displayed. FIG. 11 is a diagram illustrating an example in which three-dimensional image data is displayed with a mesh. Furthermore, data indicating time of imaging, which is data at the time of imaging, is displayed on the display device 82 together with the three-dimensional image data. Note that, together with the three-dimensional image data, together with the three-dimensional image data, data indicating time of imaging, data indicating a place of imaging (construction site and the ground), and a production serial number of the excavator 100 having acquired the three-dimensional image data may be displayed on the display device 82.

As illustrated in FIG. 12, three-dimensional image data of the entire construction site may be displayed. In the example illustrated in FIG. 12, together with the three-dimensional image data, data indicating time of imaging, which is data at the time of imaging, and data indicating a place of imaging (construction site and ground) are displayed on the display device 82. Furthermore, a production serial number of an excavator 100 having acquired the two-dimensional image data is displayed on the display device 82. In addition, thumbnails of other display data (two-dimensional image data) are displayed on the display device 82.

Note that two-dimensional image data and three-dimensional image data may be simultaneously displayed on the display device 82.

In this manner, in the present embodiment, the display data output from the data output unit 58 of the excavator 100 is output to the display device 82 of the portable device 80 via the server 301. The data output unit 58 outputs the display data associated with the excavator 100 or the portable device 80 included in the excavator 100 to the display device 82 of the portable device 80 via the server 301.

[Effects]

As described above, according to the present embodiment, the surveying at the construction site is performed by using the plurality of imaging devices 30 provided to the upper swinging body 2. The two-dimensional image data acquired by the plurality of imaging devices 30 is subjected to image processing by the data processing unit 56 by a stereo method and converted into three-dimensional image data. When display data including one or both of two-dimensional image data and three-dimensional image data is displayed on the display device 82 of the portable device 80, the driver Ma or the worker Mb can grasp the current topography of the construction site or a progress status of construction at the construction site on the basis of a display result of the display device 82.

Furthermore, the driver Ma of the excavator 100 can confirm whether there is any failure in imaging by the imaging devices 30 on the basis of the display result of the display device 82. A failure in imaging includes, for example, at least one of that a place different from a place to be imaged is imaged by a plurality of imaging devices 30 and that, when imaging is performed by the plurality of imaging devices 30, a machine, a facility, or the like not related to an object is included and thus imaging is not performed appropriately. The driver Ma of the excavator 100 can visually recognize the display device 82 and recognize the quality of two-dimensional image data or three-dimensional image data that the driver Ma has acquired using the imaging devices 30. For example, in a case where a failure is found in imaging by visual recognition of the display device 82, the driver Ma can take a measure such as re-doing the imaging.

As described above, in the present embodiment, since the driver Ma or the worker Mb can smoothly confirm two-dimensional image data or three-dimensional image data of a construction site, construction management is performed smoothly, thereby improving productivity at the construction site.

Moreover, in the present embodiment, the display data to be displayed on the display device 82 includes one or both of two-dimensional image data and three-dimensional image data. The display data is associated with the excavator 100 including imaging devices 30 that has performed imaging. Therefore, the driver Ma or the worker Mb can recognize on the basis of imaging devices 30 of which excavator 100 the display data displayed on the display device 82 has been generated. Therefore, management of display data and construction management based on the display data are smoothly performed.

Furthermore, in the present embodiment, the display data includes data at the time of imaging by imaging devices 30. Since the display data includes the data at the time of imaging, management of display data and construction management can be more appropriately performed.

Furthermore, since the data at the time of imaging includes the position data of the excavator 100, the attitude data of the excavator 100, and the time data at the time of imaging by the imaging device 30, it is possible to acquire not only the information on the basis of imaging devices 30 of which excavator 100 the two-dimensional image data or the three-dimensional image data has been generated but also information on when, where, and in what type of situation the imaging has been performed.

Moreover, the present embodiment includes the imaging possibility determining unit 55 for allowing operation of the operating device 26 on the basis of a detection signal of the attitude detector 32. This prevents imaging by the imaging devices 30 in a state where the upper swinging body 2 is moving or vibrating. Therefore, it is possible to acquire high-quality image data (two-dimensional image data or three-dimensional image data).

In addition, by displaying the display data on the display device 82 of the portable device 80, not only the driver Ma of the excavator 100 and the worker Mb working at the construction site but also, for example, a manager present at a place away from the construction site can also confirm the display data immediately by carrying the portable device 80.

Furthermore, according to the present embodiment, the display data output from the data output unit 58 of the excavator 100 is output to the display device 82 of the portable device 80 via the server 301. As a result, the display data can be smoothly distributed to many personnel involved in the construction of the construction site via the server 301.

Moreover, according to the present embodiment, the server 301 of the construction management system 300 collects display data from the plurality of excavators 100. The construction management system 300 is capable of managing a plurality of construction sites on the basis of a plurality of pieces of display data collected by the server 301. For example, it is possible to manage the progress status of construction at a construction site A on the basis of display data transmitted from excavators 100 at the construction site A at every predetermined period (for example, every day). In a similar manner, it is possible to manage the progress status of construction at a construction site B based on display data transmitted from the construction site B, and it is possible to manage the progress status of construction at a construction site C based on display data transmitted from the construction site C. Moreover, it is possible to manage the progress status of construction on the basis of the plurality of pieces of display data collected within one construction site.

Moreover, in the present embodiment, when a request signal generated by operating the operating device 81 of the portable device 80 is transmitted to the server 301, list data or display data is transmitted from the server 301 to the portable device 80. Since the list data or the display data is displayed on the display device 82 in response to a request from the driver Ma or the worker Mb, a load on communication facilities is reduced.

Second Embodiment

Figure 13:
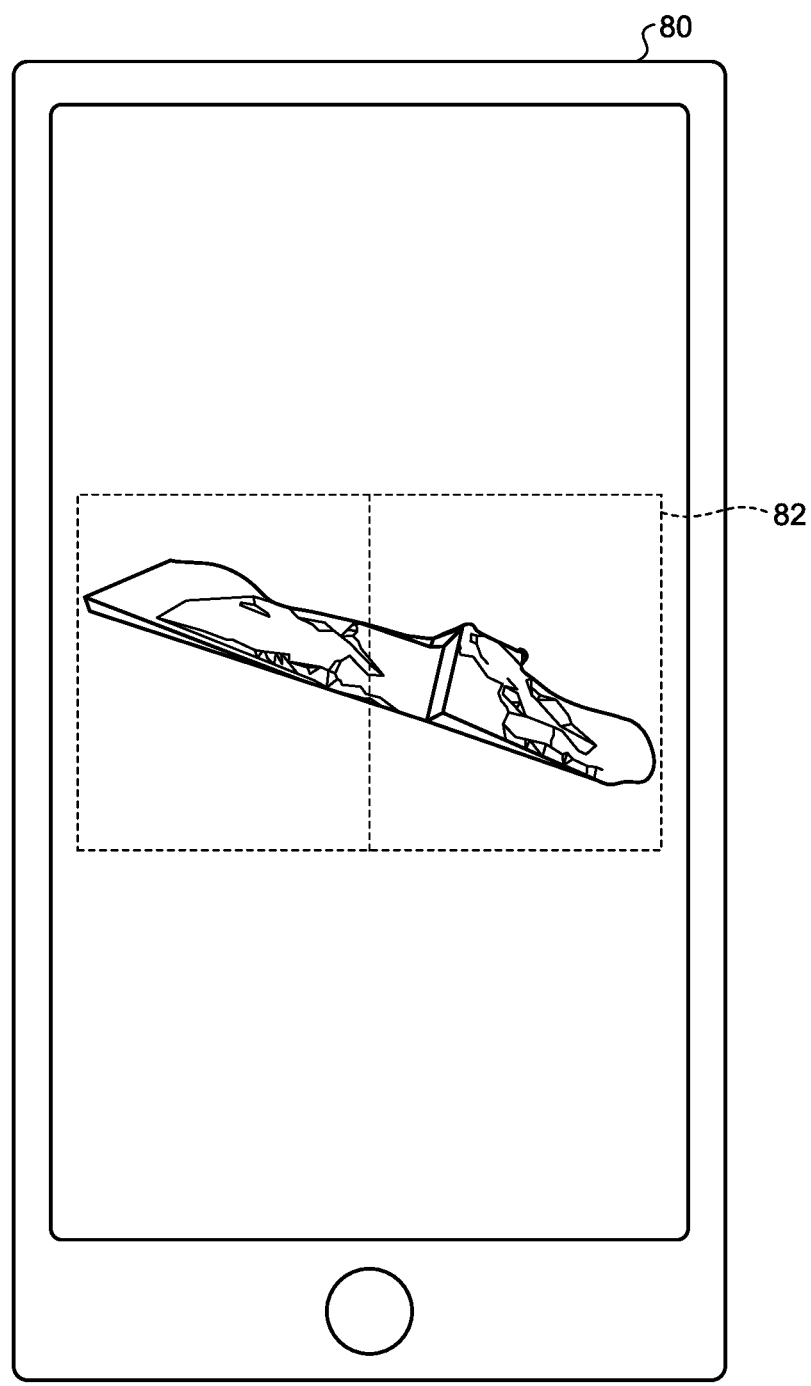
FIG. 13 is a diagram illustrating exemplary display of the display device according to the present embodiment.

A second embodiment will be described. FIG. 13 is a diagram illustrating an example of display data displayed on the display device 82 according to the present embodiment. FIG. 13 illustrates an example in which a plurality of pieces of display data are joined together and displayed. Each piece of the display data is defined in the global coordinate system. A latitude and a longitude of an edge (joint) of each piece of the display data is known data derived from the position data of the data at the time of imaging. Therefore, by joining a plurality of pieces of display data such that latitudes and longitude of adjacent display data match each other, display data of a wide range of construction site can be displayed.

Joining of the plurality of pieces of display data is performed on the basis of time data of the data at the time of imaging. As the construction progresses, the topography of the construction site changes from moment to moment. In a case where time of imaging of the plurality of pieces of display data to be joined together are different, there is a possibility that one piece of the display data is data before the construction progresses while the other piece of display data is data after the construction has progressed. In such a case, even when the plurality of pieces of display data are joined together, there is a possibility that the current situation of the construction site cannot be accurately grasped. By joining pieces of display data based on two-dimensional image data imaged at substantially the same time on the basis of the time data of the data at the time of imaging, the current situation of the construction site can be accurately grasped.

Note that the processing of generating the display data in which the plurality of pieces of display data are joined may be performed by the data processing unit 56 of the excavator 100, the arithmetic device 302 of the server 301, or the processing unit 84 of the portable device 80.

Note that FIG. 13 illustrates an example in which two pieces of display data are joined together. Three pieces of display data may be joined, four pieces of display data may be joined, or five or more pieces of display data may be joined.

Third Embodiment

Figure 14:
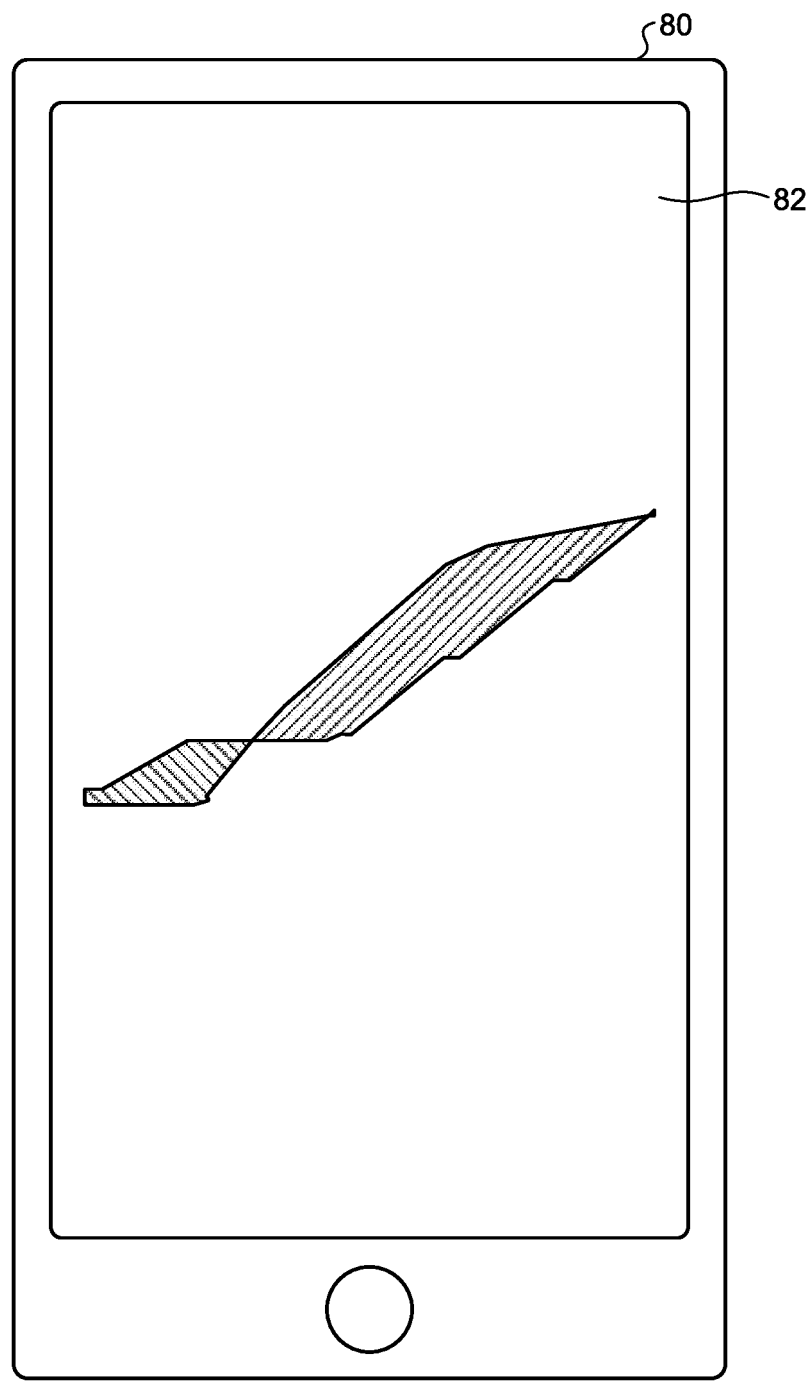
FIG. 14 is a diagram illustrating exemplary display of the display device according to the present embodiment.

A third embodiment will be described. FIG. 14 is a diagram illustrating an example of display data displayed on the display device 82 according to the present embodiment. FIG. 14 is a diagram illustrating an example of displaying a cross section of a three-dimensional topography derived from three-dimensional image data. The processing of deriving the cross section may be performed by the data processing unit 56 of the excavator 100, the arithmetic device 302 of the server 301, or the processing unit 84 of the portable device 80.

Fourth Embodiment

Figure 15:
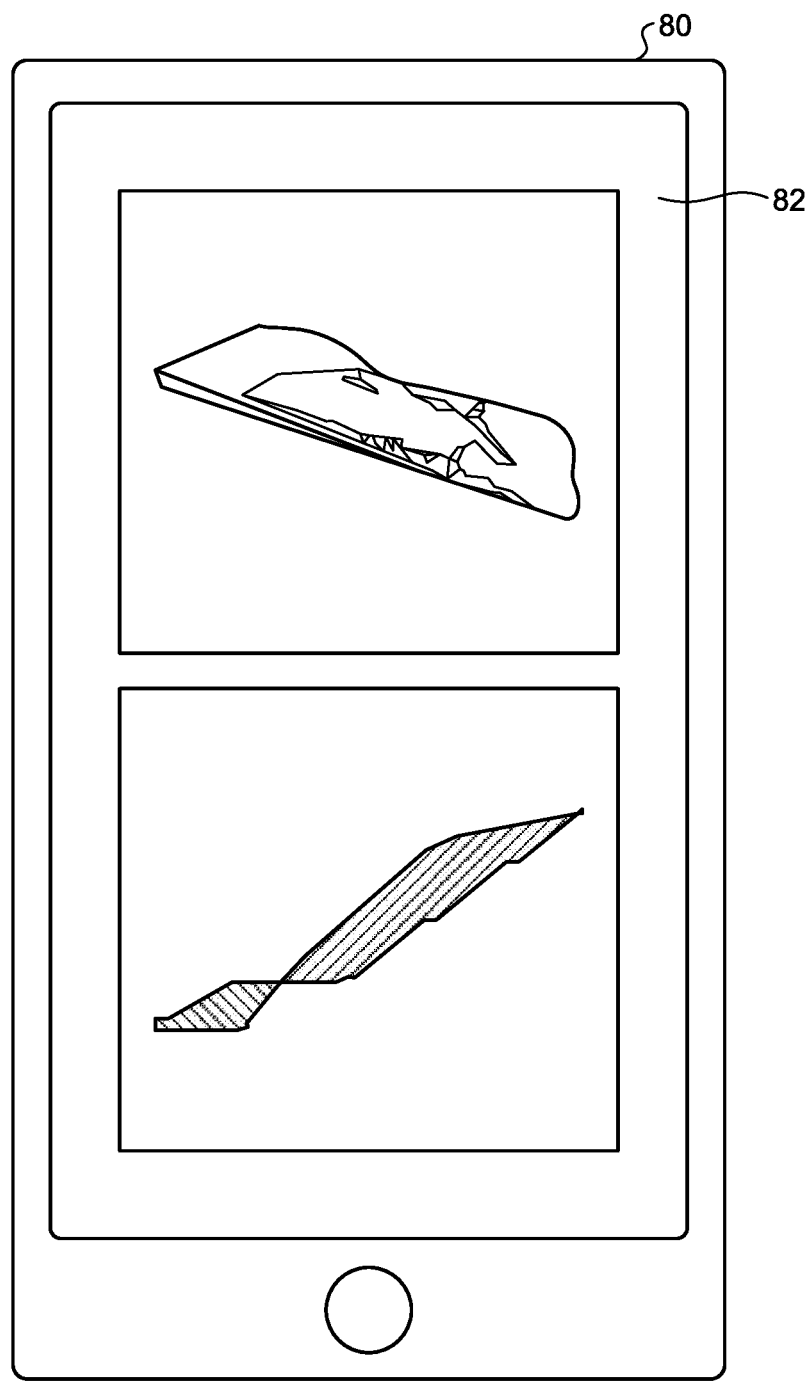
FIG. 15 is a diagram illustrating exemplary display of the display device according to the present embodiment.

A fourth embodiment will be described. FIG. 15 is a diagram illustrating an example of display data displayed on the display device 82 according to the present embodiment. As illustrated in FIG. 15, at least two pieces of display data may be simultaneously displayed on the display device 82. In the example illustrated in FIG. 15, three-dimensional image data indicating the current topography of a construction site and cross-section data indicating a cross section of the current topography are simultaneously displayed in parallel on the display screen 82 of the display device 82. Note that two-dimensional image data of the current topography of the construction site when viewed from above and the cross-section data indicating the cross section of the current topography may be simultaneously displayed on the display screen of the display device 82 in parallel.

Fifth Embodiment

Figure 16:
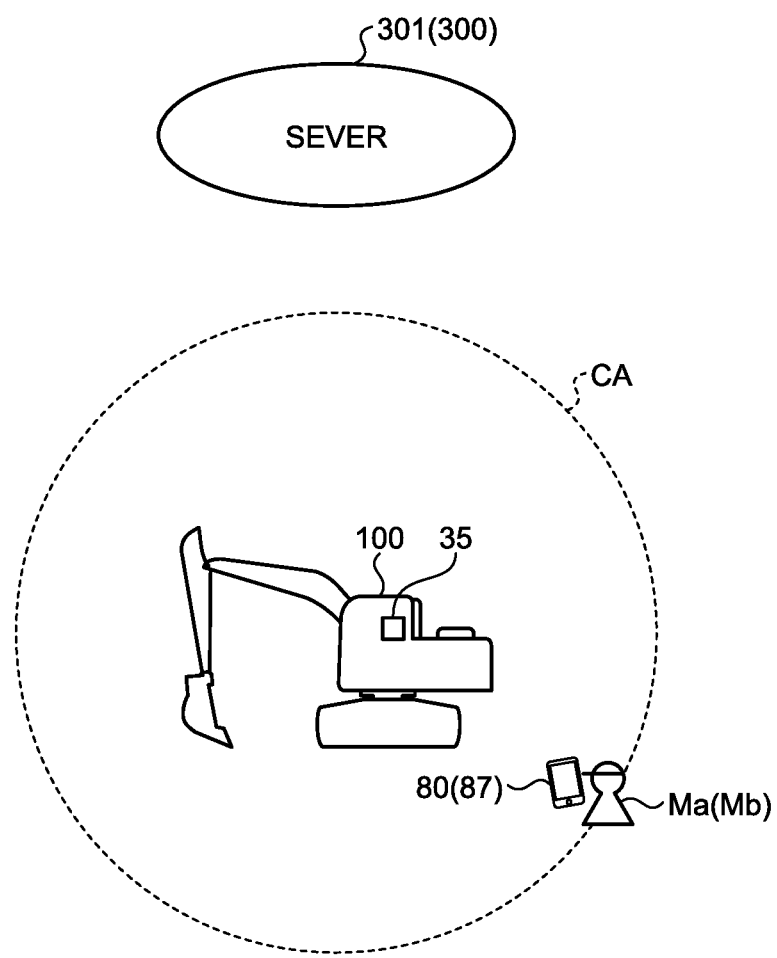
FIG. 16 is a diagram schematically illustrating an example of the construction management system according to the present embodiment.

A fifth embodiment will be described. FIG. 16 is a diagram schematically illustrating an example of the construction management method according to the present embodiment. In the present embodiment, a construction management method using a transmitter 35 will be described.

As described above, the transmitter 35 is a beacon terminal that transmits a radio wave including specific data of an excavator 100 on which the transmitter 35 is mounted. In the present embodiment, an example will be described in which display data is displayed on the display device 82 of the portable device 80 from the server 301 by using the transmitter 35 of the excavator 100 and the receiving unit 87 of the portable device 80 without operating the operating device 81 of the portable device 80 and outputting a request signal.

As illustrated in FIG. 16, the transmitter 35 for transmitting a radio wave is included in the excavator 100. The portable device 80 includes the receiving unit 87 that receives a radio wave from the transmitter 35.

Each of the excavator 100 and the portable device 80 is capable of communicating with the server 301 of the construction management system 300.

The transmitter 35 is mounted on the excavator 100. The transmitter 35 transmits a radio wave including specific data of the excavator 100. The transmitter 35 and the portable device 80 wirelessly communicates with each other. The receiving unit 87 of the portable device 80 receives a radio wave including specific data transmitted from the transmitter 35. In the present embodiment, the transmitter 35 is a beacon terminal. A beacon terminal can transmit a radio wave including specific data.

The specific data includes data specifying the transmitter 35 and the excavator 100 including the transmitter 35. A transmitter 35 is mounted on each of a plurality of excavators 100. A transmitter 35 is associated with an excavator 100. Each of the plurality of transmitters 35 transmits a radio wave including specific data of the excavator 100 including the transmitter 35. For example, among the plurality of excavators 100, a transmitter 35 included in a first excavator 100 transmits a radio wave including first specific data for specifying the first excavator 100. Among the plurality of excavators 100, a transmitter 35 included in a second excavator 100 transmits a radio wave including second specific data for specifying the second excavator 100.

The portable device 80 is held by a driver Ma or a worker Mb of an excavator 100. Application software for receiving a radio wave from a transmitter 35 is installed in the portable device 80.

When the display data is displayed on the display device 82, for example, an application software installed in the portable device 80 is activated. After the application software is activated and a startup screen is displayed on the display device 82, a login screen is displayed on the display device 82. A login account is assigned to the driver Ma or the worker Mb. The driver Ma or the worker Mb inputs authentication data such as identification information (ID) and a password while viewing the login screen.

When a radio wave transmitted from a transmitter 35 is received, the portable device 80 executes processing on the basis of the application software.

The portable device 80 can specify a transmitter 35 that has transmitted a radio wave from among the plurality of transmitters 35 on the basis of the specific data included in the received radio wave. The transmitter 35 is associated with the excavator 100. Based on the specific data included in the received radio wave, the portable device 80 specifies an excavator 100 including the transmitter 35 having transmitted the radio wave. For example, when receiving a radio wave including the first specific data, the portable device 80 specifies that the radio wave has been transmitted from the transmitter 35 of the first excavator 100. When receiving a radio wave including the second specific data, the portable device 80 specifies that the radio wave has been transmitted from the transmitter 35 of the second excavator 100.

The specific data of the excavator 100 includes identification data for specifying the excavator 100. The specific data of the excavator 100 includes at least one of model data and machine number data.

The portable device 80 detects the intensity of the received radio wave. On the basis of a distance from the transmitter 35, the intensity of the radio wave received by the portable device 80 varies. The receiving unit 87 of the portable device 80 is capable of deriving a distance between the transmitter 35 and the portable device 80 on the basis of the intensity of the detected radio wave.

As illustrated in FIG. 16, the transmitter 35 has a communication area CA. The communication area CA of the transmitter 35 is an area in which a radio wave transmitted from the transmitter 35 can be received with an intensity higher than a predetermined value. As illustrated in FIG. 16, when present in the communication area CA of the transmitter 35, the portable device 80 can receive a radio wave from the transmitter 35. When present outside the communication area CA of the transmitter 35, the portable device 80 cannot receive a radio wave from the transmitter 35. The distance that the transmitter 35 and the portable device 80 can wirelessly communicate is short. The maximum value of the distance that the transmitter 35 and the portable device 80 can wirelessly communicate is, for example, 20 m.

Next, an example of the construction management method according to the present embodiment will be described. In the storage device 303 of the server 301, a plurality of pieces of display data collected from a plurality of excavators 100 are stored.

The transmitter 35 included in the excavator 100 transmits a radio wave including the specific data of the excavator 100. When the driver Ma (or the worker Mb) holding the portable device 80 approaches the excavator 100 and the portable device 80 enters the communication area CA, the receiving unit 87 of the portable device 80 receives a radio wave transmitted from the transmitter 35.

The processing unit 84 of the portable device 80 acquires the specific data of the excavator 100 from the radio wave received by the receiving unit 87. In the following description, an excavator 100 including a transmitter 35 that has transmitted a radio wave received by the portable device 80 is referred to as a specific excavator 100 as appropriate.

When the receiving unit 87 of the portable device 80 receives a radio wave from the transmitter 35 of the specified excavator 100, the processing unit 84 of the portable device 80 generates a request signal. The request signal generated by the processing unit 84 is a signal that requests the server 301 to transmit display data based on two-dimensional image data acquired by the imaging device 30 of the specific excavator 100. The request signal generated by the processing unit 84 is transmitted to the server 301 via the communication unit 86.

In the storage device 303 of the server 301, the display data output from the data output unit 58 of the specific excavator 100 is already stored. The server 301 transmits the display data acquired by the specific excavator 100 to the portable device 80 that has transmitted the request signal on the basis of the received request signal.

In this manner, the data output unit 58 of the specific excavator 100 outputs the display data of the specific excavator 100 to the display device 82 of the portable device 80 that has received a radio wave transmitted from the specific excavator 100.

As a result, the display device 82 of the portable device 80 can display the display data of the specific excavator 100.

As described above, according to the present embodiment, the driver Ma or the worker Mb holding the portable device 80 can have the display device 82 of the portable device 80 to automatically display the display data of the specific excavator 100 only by approaching the specific excavator 100 by using the transmitter 35 and the receiving unit 87.

Note that, in a case where a plurality of pieces of display data supplied from the specific excavator 100 are stored in the storage device 303 of the server 301, list data of the plurality of pieces of display data collected from the specific excavator 100 may be transmitted from the server 301 to the portable device 80 after receiving a radio wave from the transmitter 35 and the portable device 80 transmits a request signal before the display data is transmitted from the server 301 to the portable device 80. The driver Ma or the worker Mb selects specific display data from the list data and operates the operating device 81. When the operating device 81 is operated, a request signal requesting the selected display data is transmitted to the server 301. The server 301 transmits the selected display data to the portable device 80. As a result, the display device 82 of the portable device 80 can display the selected display data.

Note that, in the present embodiment, the display data generated by the data processing unit 54 of the specific excavator 100 may be stored in the storage unit 57 of the specific excavator 100. The data output unit 58 of the specific excavator 100 may output the display data of the specific excavator 100 to the display device 82 of the portable device 80 that has received a radio wave transmitted by the specific excavator 100 without utilizing the server 301. The communication device 70 of the specific excavator 100 and the communication unit 86 of the portable device 80 can wirelessly communicate with each other. Therefore, the data output unit 58 can transmit the display data to the portable device 80 via the communication device 70.

Note that, even if the transmitter 35 is not included in the present embodiment, in a case where position data (range data) of the construction site defined by the global coordinate system is registered in the portable device 80 and the server 301 and identification data of the portable device 80 (for example, an IP address or a mail address) is registered in the server 301, the server 301 can determine whether the portable device 80 is present at the construction site by the GPS function of the portable device 80. When determining that the portable device 80 has entered the construction site, the server 301 may transmit list data related to the excavator 100 present at the construction site to the portable device 80 identification data (mail address) of which is registered. The driver Ma or the worker Mb can display the display data on the display device 82 of the portable device 80 by selecting the display data from the list data.

Note that, in the present embodiment, a beacon terminal is used as a close proximity wireless communication device of the excavator 100 and the portable device 80. As the close proximity wireless communication device, a device that performs wireless communication based on the Bluetooth (registered trademark) standard may be used, or a device that performs wireless communication based on the ZigBee standard may be used. Moreover, the transmitter 35 mounted to the excavator 100 may have its own power source such as a battery such that, even when the excavator 100 is halted, the transmitter 35 can transmit a radio wave to the portable device 80. Alternatively, the transmitter 35 may be supplied with power source from a battery (not illustrated) mounted on the excavator 100 to cause the portable device 80 to transmit a radio wave.

Other Embodiments

Note that, in the embodiments described above, at least one of two-dimensional image data and three-dimensional image data acquired by the imaging device 30 may be attached with unique data stored in the storage unit 57 and thereby transmitted to the server 301. Also in this manner, on the basis of the unique data, the server 301 can determine by imaging devices 30 of which excavator 100 the acquired two-dimensional image data or three-dimensional image data has been generated.

Note that, in the respective embodiments described above, the excavator 100 and the display device 82 of the portable device 80 may be associated with each other and thereby registered in the server 301. In a case where display data is output from the data output unit 58 of the specific excavator 100 to the server 301 and stored in the storage device 303, the arithmetic device 302 outputs the display data collected from the specific excavator 100 to a display device 82 of a portable device 80 associated with the specific excavator 100 on the basis of the unique data of the excavator 100 included in the display data. As a result, the portable device 80 displays the display data acquired by the excavator 100 associated therewith in advance. Association between an excavator 100 and a portable device 80 includes associating unique data of the excavator 100 such as a production serial number of the excavator 100 with unique data of the portable device 80 such as a mail address of the portable device 80.

Note that, in the respective embodiments described above, when display data of two-dimensional image data is displayed on the display device 82, four pieces of two-dimensional image data captured by the respective imaging devices 30A, 30B, 30C, and 30D may be simultaneously displayed on a display screen of the display device 30 in parallel. Note that, it is preferable that two-dimensional image data acquired by at least the imaging devices 30A and 30C that are close to the work machine 1 among the four imaging devices 30A, 30B, 30C, and 30D is displayed on the display device 82. By displaying the two-dimensional image data acquired by the imaging devices 30A and 30C close to the work machine 1 on the display device 82, it is possible to grasp and manage the construction situation by the work machine 1.

Note that, in the respective embodiments described above, the two-dimensional image data, the three-dimensional image data, and the data at the time of imaging transmitted from the excavator 100 to the portable device 80 may be directly transmitted from the communication device 70 of the excavator 100 to the communication unit 86 of the portable device 80 without utilizing the server 301.

Note that, in the respective embodiments described above, the display data is displayed on the display device 82 of the portable device 80. The display data may be displayed on the display device 304 of the construction management system 300. A manager can visually recognize the display device 304 and grasp the construction situation to perform construction management.

Note that, in the respective embodiments described above, the display data may be displayed on the display device 27 of the excavator 100. The driver Ma of the excavator 100 can recognize the state of the two-dimensional image data or the three-dimensional image data that the driver Ma has acquired using the imaging devices 30 by visually recognizing the display device 27. For example, in a case where a failure is found in imaging by visual recognition of the display device 27, a measure such as re-doing the imaging can be taken. The display device 27 is associated with the excavator 100. The data output unit 58 may output the display data generated by the data processing unit 56 of the excavator 100 to the display device 27 via the server 301 or may directly output to the display device 27 without utilizing the server 301.

Note that, in the respective embodiments described above, generation of the three-dimensional image data and generation of the display data are performed by the control device 50 included in the excavator 100. The two-dimensional image data and the data at the time of imaging acquired by the imaging device 30 are transmitted to the server 301 via the communication device 70, and the arithmetic device 302 of the server 301 may generate display data including three-dimensional image data on the basis of the transmitted two-dimensional image data and the data at the time of imaging. In that case, functions corresponding to the data processing unit 81 and the data output unit 82 are included in the arithmetic device 302 of the server 301. The display data generated in the server 301 may be output (distributed) to one or both of the display device 27 of the excavator 100 and the display device 82 of the portable device 80.

Alternatively, the two-dimensional image data and the data at the time of imaging acquired by the imaging devices 30 may be transmitted to the portable device 80 via the communication device 70 and the server 301, and the processing unit 84 of the portable device 80 may generate display data including three-dimensional image data on the basis of the transmitted two-dimensional image data and the data at the time of imaging. In that case, functions corresponding to the data processing unit 81 and the data output unit 82 are included in the processing unit 84 of the portable device 80. The display data generated in the processing unit 84 of the portable device 80 may be output to the display device 82 of the portable device 80 or output (distributed) to one or both of the display device 27 of the excavator 100 and the display device 304 of the server 301.

Note that, in the respective embodiments described above, the imaging possibility determining unit 55 may be omitted.

Note that, in the respective embodiments described above, after two-dimensional image data or three-dimensional image data based on imaging by the imaging devices 30 is transmitted to the server 301, the server 301 may automatically determine the quality of the two-dimensional image data or the three-dimensional image data. In a case where it is determined that the quality of the image is bad, the two-dimensional image data or the three-dimensional image data may be automatically notified to the excavator 100, the portable device 80, or the like on the basis of an IP address thereof. Note that, in a case where a support center for supporting construction at a construction site is installed, after two-dimensional image data or three-dimensional image data based on imaging by the imaging devices 30 is transmitted to the support center, an arithmetic processing unit at the support center may automatically determine the quality of the two-dimensional image data or the three-dimensional image data. In a case where it is determined that the quality is bad, the fact that the two-dimensional image data or the three-dimensional image data has a bad quality may be automatically notified to the excavator 100, the portable device 80, or the like on the basis of an IP address thereof. In this manner, a measure such as re-doing of imaging can be taken.

REFERENCE SIGNS LIST

1 WORK MACHINE
2 UPPER SWINGING BODY (VEHICLE BODY)
3 LOWER TRAVELING BODY (TRAVELING DEVICE)
3C CRAWLER
4 CAB
5 MACHINE ROOM
6 COUNTERWEIGHT
7 LINK MEMBER
8 LINK MEMBER
10 TOOTH
11 BUCKET
12 ARM
13 BOOM
14 BUCKET CYLINDER STROKE SENSOR
15 ARM CYLINDER STROKE SENSOR
16 BOOM CYLINDER STROKE SENSOR
21 BUCKET CYLINDER
22 ARM CYLINDER
23 BOOM CYLINDER
24 DRIVING SEAT
25 OPERATING DEVICE
26 OPERATING DEVICE
27 DISPLAY DEVICE
30 IMAGING DEVICE
31 POSITION DETECTOR
32 ATTITUDE DETECTOR
33 AZIMUTH DETECTOR
34 TOOTH POSITION DETECTOR
35 TRANSMITTER
36 TIMER
50 CONTROL DEVICE
51 INPUT/OUTPUT UNIT
52 IMAGE DATA ACQUIRING UNIT
53 POSITION DATA ACQUIRING UNIT

54 ATTITUDE DATA ACQUIRING UNIT
55 IMAGING POSSIBILITY DETERMINING UNIT
56 DATA PROCESSING UNIT
57 STORAGE UNIT
58 DATA OUTPUT UNIT
59 DATA RECEIVING UNIT
80 PORTABLE DEVICE
81 OPERATING DEVICE
82 DISPLAY DEVICE
83 INPUT/OUTPUT UNIT
84 PROCESSING UNIT
85 STORAGE UNIT
86 COMMUNICATION UNIT
87 RECEIVING UNIT
100 EXCAVATOR (CONSTRUCTION MACHINE)
200 CONTROL SYSTEM
300 CONSTRUCTION MANAGEMENT SYSTEM
301 SERVER
302 ARITHMETIC DEVICE
303 STORAGE DEVICE
304 DISPLAY DEVICE
305 COMMUNICATION DEVICE
RX SWINGING AXIS

The invention claimed is:

1. A construction machine, comprising:
a vehicle body;
a plurality of imaging devices provided to the vehicle body;
an attitude detector configured to detect motion and inclination with respect to a horizontal plane of the vehicle body;
an imaging possibility unit configured to determine whether imaging by the imaging devices is possible in response to whether motion is detected by the attitude detector;
a data processing unit configured to perform image processing on each piece of two-dimensional image data acquired by the plurality of imaging devices and non-image data at the time of imaging by the imaging devices to generate three-dimensional image data;
the data processing unit being further configured to correct an inclination of the generated three-dimensional image data in response to the attitude detector detecting a corresponding inclination of the vehicle body with respect to the horizontal plane, the correction such that the generated three-dimensional image data becomes as if having been imaged by the construction machine in a state of being placed on the horizontal plane; and
a data output unit configured to output the two-dimensional image data and the corrected generated three-dimensional image data to a display device associated with the vehicle body,
wherein the non-image data at the time of imaging includes at least one of position data of the vehicle body, attitude data of the vehicle body, and time data at the time of imaging by the imaging devices.

2. The construction machine according to claim 1, wherein the display device is provided to the vehicle body.

3. The construction machine according to claim 1, comprising:
a transmitter configured to transmit a radio wave including specific data of the vehicle body,
wherein the data output unit is configured to output the display data to the display device having received the radio wave.

4. The construction machine according to claim 1, wherein the display data further includes data at a time of imaging by the imaging devices.

5. The construction machine according to claim 4, wherein the data at the time of imaging includes at least one of position data of the vehicle body, attitude data of the vehicle body, and time data at the time of imaging by the imaging devices.

6. The construction machine according to claim 1, comprising:
an operating device configured to operate the imaging devices; and
an attitude detector configured to detect motion of the vehicle body, wherein
the imaging possibility determining unit is configured to allow operation of the operating device on the basis of a detection signal of the attitude detector.

7. A construction management system, comprising:
a data processing unit configured to perform image processing on each piece of two-dimensional image data of a construction machine acquired by a plurality of imaging devices and non-image data at the time of imaging by the imaging devices comprised in the construction machine to generate three-dimensional image data;
an attitude detector configured to detect motion and inclination with respect to a horizontal plane of the construction machine;
an imaging possibility unit configured to determine whether imaging by the imaging devices is possible in response to whether motion is detected by the attitude detector;
the data processing unit being further configured to correct an inclination of the generated three-dimensional image data in response to the attitude detector detecting a corresponding inclination of the construction machine with respect to the horizontal plane, the correction such that the generated three-dimensional image data becomes as if having been imaged by the construction machine in a state of being placed on the horizontal plane; and
a data output unit configured to output display data to a display device, the display data including the two-dimensional image data and the corrected generated three-dimensional image data and being associated with the construction machine,
wherein the non-image data at the time of imaging includes at least one of position data of the vehicle body, attitude data of the vehicle body, and time data at the time of imaging by the imaging devices.

8. The construction management system according to claim 7, wherein the display device is provided to a portable device.

9. The construction management system according to claim 7, comprising:
a server,
wherein the display data output from the data output unit is output to the display device on the basis of a correspondence relationship between the construction machine and the display device.

10. The construction management system according to claim 9, wherein the server is configured to collect the display data from the plurality of construction machines.

11. The construction management system according to claim 9, wherein the portable device has an operating device,
a request signal generated by operating the operating device of the portable device is transmitted to the server, and
the server is configured to transmit the display data to the display device on the basis of the request signal.

12. The construction management system according to claim 7,
wherein the data output unit is configured to outputs the display data to the display device having received a radio wave including specific data of the construction machine transmitted from a transmitter provided to the construction machine.

13. The construction management system according to claim 7,
wherein the data output unit is configured to output the display data to the display device associated with the construction machine.

14. The construction management system according to claim 7,
wherein the display data further includes data at a time of imaging by the imaging devices.

15. The construction management system according to claim 14,
wherein the data at the time of imaging includes at least one of position data of the construction machine, attitude data of the construction machine, and time data at the time of imaging by the imaging devices.

* * * * *